US007946101B1

(12) United States Patent
McGonagle et al.

(10) Patent No.: US 7,946,101 B1
(45) Date of Patent: May 24, 2011

(54) METHOD AND SYSTEM FOR VERIFICATION OF CONTENTS OF A MULTI-CELL, MULTI-PRODUCT BLISTER PACK

(75) Inventors: Sean McGonagle, Buffalo Grove, IL (US); Greg Pankow, Morton Grove, IL (US); J. Randolph Lewis, Deer Park, IL (US); Victor Lee, Lake Forest, IL (US)

(73) Assignee: Walgreen Co., Deerfield, IL (US)

( * ) Notice: Subject to any disclaimer, the term of this patent is extended or adjusted under 35 U.S.C. 154(b) by 340 days.

(21) Appl. No.: 12/130,575

(22) Filed: May 30, 2008

Related U.S. Application Data

(60) Provisional application No. 60/940,790, filed on May 30, 2007.

(51) Int. Cl.
*B65B 59/00* (2006.01)
*G06F 17/00* (2006.01)

(52) U.S. Cl. ................ 53/474; 53/501; 53/502; 53/504; 53/238; 235/375; 700/216

(58) Field of Classification Search .................... 53/473, 53/474, 475, 501, 502, 503, 504, 235, 238, 53/240, 900, 393; 700/216, 218, 219, 223, 700/231, 240, 242; 235/375, 385
See application file for complete search history.

(56) References Cited

U.S. PATENT DOCUMENTS 2,339,115 A 1/1944 Scherer
3,069,273 A 12/1962 Wayne
3,283,885 A 11/1966 Grunewald et al.
3,389,531 A 6/1968 Ehe et al.
3,503,493 A 3/1970 Nagy
3,737,029 A 6/1973 Serrell et al.
3,757,995 A 9/1973 Armstrong
3,780,856 A 12/1973 Braverman
3,924,748 A 12/1975 Braverman
4,120,399 A 10/1978 Clarke
4,196,809 A 4/1980 Tonrey
4,295,567 A 10/1981 Knudsen et al.
(Continued)

FOREIGN PATENT DOCUMENTS

DE 4429503 A1 2/1996
(Continued)

OTHER PUBLICATIONS

Office action for U.S. Appl. No. 12/130,489 dated Jan. 22, 2010.
(Continued)

*Primary Examiner* — Paul R Durand
(74) *Attorney, Agent, or Firm* — Francis C. Kowalik; Marshall, Gerstein & Borun LLP

(57) ABSTRACT

A method of transferring a plurality of tablets of a product from a first blister card comprising a first plurality of blisters to a second blister card comprising a second plurality of blisters includes discharging the plurality of tablets from the first plurality of blisters of the first blister card. Then, each of the plurality of tablets are guided along one of a plurality of passageways defined by a transfer fixture positioned between the first blister card and the second blister card. Finally, the plurality of tablets are received in the second plurality of blisters of the second blister card. The method includes monitoring the deposit of product to the blister card and verifying the contents of the blister card.

10 Claims, 15 Drawing Sheets

U.S. PATENT DOCUMENTS

| | | | | |
|---|---|---|---|---|
| 4,340,141 | A | | 7/1982 | Fischer |
| 4,428,709 | A | | 1/1984 | Peters |
| 4,437,579 | A | | 3/1984 | Obland |
| 4,655,026 | A | | 4/1987 | Wigoda |
| 4,694,996 | A | | 9/1987 | Siegel |
| 4,844,246 | A | | 7/1989 | Harrison et al. |
| 4,860,899 | A | | 8/1989 | McKee |
| 4,889,236 | A | | 12/1989 | Bartell et al. |
| 4,909,414 | A | | 3/1990 | Heath |
| 4,955,481 | A | | 9/1990 | Novinski et al. |
| 4,975,015 | A | | 12/1990 | Harding |
| 5,009,894 | A | | 4/1991 | Hsiao |
| 5,014,851 | A | | 5/1991 | Wick |
| 5,038,968 | A | | 8/1991 | Albetski |
| 5,050,739 | A | | 9/1991 | Hannan et al. |
| 5,265,728 | A | | 11/1993 | Allendorf et al. |
| 5,323,907 | A | | 6/1994 | Kalvelage |
| 5,368,187 | A | | 11/1994 | Poncetta et al. |
| 5,377,836 | A | | 1/1995 | Eisenbraun |
| 5,431,283 | A | | 7/1995 | Weinstein et al. |
| 5,460,471 | A | | 10/1995 | Connor et al. |
| 5,509,773 | A | | 4/1996 | Connor et al. |
| 5,544,921 | A | * | 8/1996 | Cynan et al. .................... 283/70 |
| 5,549,204 | A | | 8/1996 | Toren et al. |
| 5,564,593 | A | | 10/1996 | East, Sr. |
| 5,685,420 | A | | 11/1997 | Martin et al. |
| 5,737,902 | A | | 4/1998 | Aylward |
| 5,740,717 | A | | 4/1998 | Sowden et al. |
| 5,752,371 | A | | 5/1998 | Mosley |
| 5,765,606 | A | | 6/1998 | Takemasa et al. |
| 5,788,079 | A | | 8/1998 | Bouthiette et al. |
| 5,799,468 | A | | 9/1998 | Eck et al. |
| 5,806,287 | A | * | 9/1998 | Trechsel ......................... 53/502 |
| 5,915,559 | A | | 6/1999 | Hulick et al. |
| 5,941,302 | A | | 8/1999 | Hattori et al. |
| 5,954,202 | A | | 9/1999 | Mellon |
| 6,021,623 | A | | 2/2000 | Bouthiette et al. |
| 6,023,906 | A | | 2/2000 | Folkersen |
| 6,023,916 | A | | 2/2000 | Bouthiette et al. |
| 6,024,222 | A | | 2/2000 | Friberg et al. |
| 6,024,247 | A | | 2/2000 | Birr et al. |
| 6,155,423 | A | | 12/2000 | Katzner et al. |
| 6,206,233 | B1 | | 3/2001 | Schulze |
| 6,219,997 | B1 | | 4/2001 | Friberg et al. |
| 6,244,462 | B1 | | 6/2001 | Ehrensvard et al. |
| 6,273,986 | B1 | * | 8/2001 | Egan ............................. 156/277 |
| 6,318,051 | B1 | | 11/2001 | Preiss et al. |
| 6,349,831 | B1 | | 2/2002 | Buss |
| 6,382,412 | B1 | | 5/2002 | Wood |
| 6,382,420 | B1 | | 5/2002 | Bouthiette et al. |
| 6,412,636 | B1 | | 7/2002 | Jones et al. |
| 6,491,211 | B1 | | 12/2002 | Evans et al. |
| 6,497,083 | B1 | | 12/2002 | Garwood et al. |
| 6,550,618 | B2 | | 4/2003 | Peterson |
| 6,557,740 | B1 | | 5/2003 | Dent |
| 6,581,356 | B2 | | 6/2003 | Kim |
| 6,628,199 | B1 | | 9/2003 | Ehrensvard et al. |
| 6,652,215 | B1 | | 11/2003 | Parker et al. |
| 6,681,935 | B1 | | 1/2004 | Lewis |
| 6,698,425 | B1 | | 3/2004 | Widerstrom et al. |
| 6,752,272 | B2 | | 6/2004 | Jones et al. |
| 6,761,010 | B1 | * | 7/2004 | Gibson ........................... 53/390 |
| 6,778,631 | B2 | * | 8/2004 | Franke ............................ 378/57 |
| 6,802,422 | B2 | | 10/2004 | Kalvelage et al. |
| 6,845,873 | B1 | * | 1/2005 | Chattey ......................... 212/270 |
| 6,848,580 | B2 | | 2/2005 | Paliotta et al. |
| 6,951,282 | B2 | | 10/2005 | Jones |
| 6,964,338 | B2 | | 11/2005 | Kancsar et al. |
| 6,978,894 | B2 | | 12/2005 | Mundt |
| 6,997,320 | B1 | | 2/2006 | Kancsar et al. |
| 6,997,344 | B2 | | 2/2006 | Brown et al. |
| 7,000,768 | B2 | | 2/2006 | Morita et al. |
| 7,025,207 | B2 | | 4/2006 | Breu et al. |
| 7,055,294 | B1 | | 6/2006 | Lewis |
| 7,063,211 | B2 | | 6/2006 | Williams-Hartman |
| 7,090,079 | B2 | | 8/2006 | Ehrlund et al. |
| 7,126,879 | B2 | | 10/2006 | Snyder |
| 7,188,728 | B2 | | 3/2007 | Williams-Hartman |
| 7,308,984 | B2 | | 12/2007 | Bouthiette et al. |
| 7,334,379 | B1 | | 2/2008 | Siegel et al. |
| 7,336,564 | B2 | | 2/2008 | Feodoroff et al. |
| 7,426,814 | B2 | | 9/2008 | Knoth |
| 7,431,160 | B2 | | 10/2008 | Drought et al. |
| 7,837,093 | B1 | * | 11/2010 | Leu et al. ...................... 235/375 |
| 7,856,794 | B2 | * | 12/2010 | Zieher ............................ 53/246 |
| 2002/0045184 | A1 | | 4/2002 | Chen |
| 2002/0104773 | A1 | | 8/2002 | Kalvelage et al. |
| 2003/0031595 | A1 | | 2/2003 | Kirchhevel et al. |
| 2003/0032190 | A1 | | 2/2003 | Brown et al. |
| 2003/0034271 | A1 | | 2/2003 | Burridge |
| 2003/0168376 | A1 | | 9/2003 | Taneja et al. |
| 2004/0026293 | A1 | | 2/2004 | Hughes |
| 2004/0069675 | A1 | | 4/2004 | Stevens |
| 2004/0108240 | A1 | | 6/2004 | Ragot |
| 2004/0188315 | A1 | | 9/2004 | Morita et al. |
| 2005/0051454 | A1 | | 3/2005 | Coe et al. |
| 2005/0082194 | A1 | | 4/2005 | Fry et al. |
| 2005/0102838 | A1 | | 5/2005 | Leason |
| 2005/0112194 | A1 | | 5/2005 | Gervais et al. |
| 2005/0125097 | A1 | * | 6/2005 | Chudy et al. .................. 700/236 |
| 2005/0173291 | A1 | | 8/2005 | Specker et al. |
| 2005/0178692 | A1 | | 8/2005 | Chang |
| 2005/0210682 | A1 | | 9/2005 | Bartholin |
| 2005/0269238 | A1 | | 12/2005 | Reape et al. |
| 2005/0274643 | A1 | | 12/2005 | Arnold |
| 2005/0274644 | A1 | | 12/2005 | Williams-Hartman |
| 2006/0021900 | A1 | | 2/2006 | Feodoroff |
| 2006/0042987 | A1 | | 3/2006 | Buss |
| 2006/0054682 | A1 | * | 3/2006 | de la Huerga ................. 235/375 |
| 2006/0060597 | A1 | | 3/2006 | Stevens |
| 2006/0086639 | A1 | | 4/2006 | Priebe et al. |
| 2006/0144749 | A1 | | 7/2006 | Arnold et al. |
| 2006/0161298 | A1 | * | 7/2006 | DiMaggio ..................... 700/244 |
| 2006/0249420 | A1 | | 11/2006 | Hession |
| 2006/0277870 | A1 | | 12/2006 | Feehan et al. |
| 2006/0289328 | A1 | | 12/2006 | Hession |
| 2007/0023317 | A1 | | 2/2007 | Brozell et al. |
| 2007/0045149 | A1 | | 3/2007 | Hession |
| 2007/0048413 | A1 | | 3/2007 | Glydon |
| 2007/0056876 | A1 | | 3/2007 | Jones |
| 2007/0084150 | A1 | * | 4/2007 | Siegel et al. .................... 53/475 |
| 2007/0084746 | A1 | | 4/2007 | Udo et al. |
| 2007/0084747 | A1 | | 4/2007 | Gherdan et al. |
| 2007/0125679 | A1 | | 6/2007 | Smith |
| 2007/0205131 | A1 | | 9/2007 | Bouthiette |
| 2007/0205132 | A1 | | 9/2007 | Bouthiette |
| 2007/0205133 | A1 | | 9/2007 | Valentine et al. |
| 2007/0274815 | A1 | | 11/2007 | Davidson et al. |
| 2007/0284280 | A1 | | 12/2007 | Young |
| 2007/0289258 | A1 | * | 12/2007 | Jung et al. ....................... 53/443 |
| 2008/0023366 | A1 | | 1/2008 | Bouthiette |
| 2008/0110791 | A1 | | 5/2008 | Specker |
| 2008/0190076 | A1 | | 8/2008 | Klingel et al. |
| 2008/0202070 | A1 | | 8/2008 | Gertitschke et al. |
| 2008/0204233 | A1 | * | 8/2008 | Agrawal et al. ............ 340/572.1 |
| 2009/0120042 | A1 | * | 5/2009 | Zieher ............................ 53/467 |
| 2010/0089997 | A1 | * | 4/2010 | Carson et al. ................. 235/375 |
| 2010/0096450 | A1 | * | 4/2010 | Silverbrook et al. ......... 235/380 |
| 2011/0000170 | A1 | * | 1/2011 | Burg et al. ...................... 53/474 |

FOREIGN PATENT DOCUMENTS

| | | | |
|---|---|---|---|
| DE | 10 2004 020 510 | A1 | 11/2005 |
| EP | 1 270 441 | A1 | 1/2003 |
| EP | 1 884 360 | A2 | 2/2008 |
| EP | 1 655 230 | B1 | 3/2008 |
| EP | 1 930 251 | A1 | 6/2008 |
| EP | 1 964 788 | A1 | 9/2008 |
| FR | 2750403 | A1 | 1/1998 |
| WO | WO-98/56704 | A2 | 12/1998 |
| WO | WO-03/053794 | A1 | 7/2003 |
| WO | WO-03/076303 | | 9/2003 |
| WO | WO-03/089333 | A1 | 10/2003 |
| WO | WO-2004/103857 | A1 | 12/2004 |
| WO | WO-2005/023672 | A1 | 3/2005 |
| WO | WO-2005/110864 | A1 | 11/2005 |

| | | | |
|---|---|---|---|
| WO | WO-2005/110889 | | 11/2005 |
| WO | WO-2005/110890 | A1 | 11/2005 |
| WO | WO-2007/046126 | A1 | 4/2007 |

OTHER PUBLICATIONS

Office action for U.S. Appl. No. 12/130,140 dated Feb. 19, 2010.
Office action for U.S. Appl. No. 12/130,619 dated Mar. 1, 2010.
Office action for U.S. Appl. No. 12/130,400 dated Sep. 15, 2009.
Dispill systeme de distribution de medicaments, "Pour Les Pharmaciens," Retrieved from the Internet on Oct. 8, 2008. URL:http://www.dispill.com/plateaux.html.
Medicine-On-Time, "Home Page," Retrieved from the Internet on Oct. 8, 2008. URL:http://www.medicine-on-time.com.
MTS Medication Technologies, "Sureseal™," Retrieved from the Internet on Oct. 8, 2008. URL:http://www.mts-mt.com/index.php?module=NukeWrapper&url=/products/machine.html?idx=13.
Final Office action for U.S. Appl. No. 12/130,400 dated Mar. 10, 2010.

* cited by examiner

900

METHOD AND SYSTEM FOR VERIFICATION OF CONTENTS OF A MULTI-CELL, MULTI-PRODUCT BLISTER PACK

CROSS-REFERENCE TO RELATED APPLICATIONS

The priority benefit of U.S. Provisional Patent Application No. 60/940,790, filed May 30, 2007, is claimed, and the entire contents thereof are hereby incorporated herein by reference.

FIELD OF THE INVENTION

The present invention relates to blister packs for storing a product, for example, and more particularly, to blister packs for storing multiple doses of medication, vitamins, pills, etc., for simultaneous ingestion.

BACKGROUND

Various products such as over-the-counter pharmaceuticals have conventionally been offered in single-dose blister cards for providing a consumer individual doses of the product. The blister cards generally comprise a thin sheet of transparent material defining a plurality of blisters. A removable backing (e.g., foil, plastic, or film) is typically adhered to the transparent material for sealing each blister individually. Each blister contains a single dose such as one or two tablets of the subject medication, e.g., cold medicine. Some manufacturers of the blister cards include perforations between the individual blisters, thereby enabling a consumer to remove one or more blisters from the blister card for transporting or discarding, for example. Immediately prior to ingestion, the consumer needs only to apply a force to the blister and push the medicine through the foil backing or to peel off the backing to release the product.

Such conventional single-dose blister cards are also utilized by pharmacists for prescription medications. Additionally, in recent years, pharmacists have begun utilizing multi-dose blister cards. Multi-dose blister cards are constructed generally identical to single-dose blister cards, although slightly larger in some cases. For example, multi-dose blister cards include individual blisters sized and configured to accommodate multiple tablets, and more particularly, multiple doses of different medications. Such multi-dose blister cards can help reduce confusion among patients having to ingest multiple prescriptions, for example, on any given day. One typical multi-dose blister card may include, for example, an individual blister for each day of the week, where each blister contains the prescribed medication for that day. Accordingly, the blisters for Monday, Wednesday, and Friday may contain, for example, two drug tablets, while the blisters for Tuesday and Thursday may contain three drug tablets. Accordingly, the patient must only identify the day of the week (and time of day) to ensure that all prescribed medications are ingested for that day.

Generally, there are two methods available for preparing such multi-dose blister cards. A first method includes a trained technician manually placing the appropriate drug in each blister. Additionally, most states within the United States of America require that a licensed pharmacist personally review and confirm that the entire blister card contains the correct drug or drugs, as well as the doses for each, prior to delivering the prescription to the patient. Such manual preparation is time-consuming, prone to human error, and costly.

Another method for filling such multi-dose blister packs includes utilizing a complex machine that holds the empty blister pack and sorts drugs into the appropriate blisters in an automated or semi-automated fashion. Once the blister cards are filled, however, a licensed pharmacist must personally review and confirm the contents in accordance with local laws. Such machines involve complex hardware and software components, and thus are costly to implement.

SUMMARY

One embodiment of the present disclosure comprises a method of transferring a plurality of tablets of a product from a first blister card comprising a first plurality of blisters to a second blister card comprising a second plurality of blisters. The method includes discharging the plurality of tablets from the first plurality of blisters of the first blister card. Then, each of the plurality of tablets are guided along one of a plurality of passageways defined by a transfer fixture positioned between the first blister card and the second blister card. Finally, the plurality of tablets are received in the second plurality of blisters of the second blister card.

In some embodiments, discharging the plurality of tablets comprises simultaneously discharging the plurality of tablets.

In another embodiment, discharging the plurality of tablets comprises simultaneously collapsing the first plurality of blisters of the first blister card with a press plate.

In another embodiment, discharging the plurality of tablets further comprises cutting a backing material of the first blister card adjacent the first plurality of blisters simultaneously with collapsing the first plurality of blisters.

In some embodiments, guiding each of the plurality of tablets comprises generating friction between the plurality of tablets and the transfer fixture, thereby controlling the speed at which the plurality of tablets travel along the plurality of passageways.

In another embodiment, guiding the plurality of tablets comprises guiding each of the plurality of tablets through one of a plurality of angled feed tubes of the transfer fixture, the plurality of angled feed tubes defining the plurality of passageways.

One embodiment further comprises selecting the transfer fixture from a plurality of transfer fixtures prior to discharging the plurality of tablets, each of the plurality of transfer fixtures comprising a distinct configuration of a plurality of passageways.

Another embodiment further comprises selecting the first blister card from a plurality of blister cards, each of the plurality of blister cards containing a plurality of tablets of a distinct product.

In yet another embodiment, the passageways of the transfer fixture are adjusted into a predetermined configuration, the predetermined configuration that is dependent on a configuration of the second plurality of blisters on the second blister card.

In another embodiment, the first blister card and the second blister card are loaded into a filling machine prior to discharging the plurality of tablets.

In such an embodiment, discharging the plurality of tablets comprises actuating the filling machine.

An alternative embodiment of the present disclosure comprises a method of filling a multi-dose blister card. First, a multi-dose blister card comprising a plurality of multi-dose blisters is selected. Then, the multi-dose blister card is positioned relative to a transfer fixture that defines a plurality of passageways, each passageway adapted to communicate with one of the plurality of multi-dose blisters. A first intermediate blister card comprising a plurality of tablets of a first product stored within a plurality of intermediate blisters is then selected. Then, the first intermediate blister card is positioned at a location opposite the transfer fixture from the multi-dose blister card. The plurality of tablets can then be transferred from the plurality of intermediate blisters of the first intermediate blister card, through the plurality of passageways of the transfer fixture, and into the plurality of multi-dose blisters of the multi-dose blister card.

In some embodiments, transferring the plurality of tablets comprises simultaneously discharging the plurality of tablets from the plurality of intermediate blisters of the first intermediate blister card.

In another embodiment, transferring the plurality of tablets comprises simultaneously collapsing the plurality of intermediate blisters of the first intermediate blister card with a press plate.

In still another embodiment, transferring the plurality of tablets further comprises cutting a backing material of the first intermediate blister card adjacent the plurality of intermediate blisters simultaneously with collapsing the first plurality of intermediate blisters.

In some embodiments, transferring the plurality of tablets comprises generating friction between the plurality of tablets and the transfer fixture, thereby controlling the speed at which the plurality of tablets travel through the plurality of passageways.

In another embodiment, transferring the plurality of tablets comprises transferring the plurality of tablets through a plurality of corresponding angled feed tubes of the transfer fixture, the angled feed tubes defining the plurality of passageways.

Another embodiment further comprises selecting the transfer fixture from a plurality of transfer fixtures prior to transferring the plurality of tablets, each of the plurality of transfer fixtures comprising a distinct configuration of a plurality of passageways.

In some embodiments, the first intermediate blister card is selected from a plurality of intermediate blister cards, each of the plurality of intermediate blister cards containing a plurality of tablets of a distinct product.

Another embodiment further comprises adjusting the passageways of the transfer fixture into a predetermined configuration that is dependent on a configuration of the plurality of multi-dose blisters of the multi-dose blister card.

In some embodiments, positioning the multi-dose blister card and the first intermediate blister card relative to the transfer fixture comprises loading the multi-dose blister card and the first intermediate blister card into a filling machine.

In some embodiments, transferring the plurality of tablets comprises actuating the filling machine.

In a still further embodiment, the method further comprises selecting a second intermediate blister card comprising a plurality of tablets of a second product stored within a plurality of intermediate blisters. Then, the second intermediate blister card can be positioned at a location that is opposite the transfer fixture from the multi-dose blister card. Finally, the plurality of tablets can be transferred from the plurality of intermediate blisters of the second intermediate blister card, through the plurality of passageways of the transfer fixture, and into the plurality of multi-dose blisters of the multi-dose blister card, such that at least one of the multi-dose blisters contains one tablet of the first product and one tablet of the second product.

Yet another embodiment of the present disclosure comprises a method of filling a multi-dose blister card that includes selecting a multi-dose blister card comprising a plurality of multi-dose blisters. Then, the multi-dose blister card is loaded into a filing machine relative to a transfer fixture that defines a plurality of passageways, each passageway adapted to communicate with one of the plurality of multi-dose blisters. Next, a first intermediate blister card can be selected from a plurality of intermediate blister cards, each of the plurality of intermediate blister cards comprising a plurality of tablets of a distinct product stored within a plurality of intermediate blisters such that the first intermediate blister card comprises a plurality of tablets of a first product stored within a first plurality of intermediate blisters. Then, the first intermediate blister card can be loaded into the filling machine at a location opposite the transfer fixture from the multi-dose blister card. Next, a press of the filling machine is actuated into engagement with the first plurality of intermediate blisters of the first intermediate blister card. The plurality of tablets are then transferred from the first plurality of intermediate blisters of the first intermediate blister card, through the plurality of passageways of the transfer fixture, and into the plurality of multi-dose blisters of the multi-dose blister card.

In some embodiments, the method further comprises removing the first intermediate blister card from the filling machine. Then, a second intermediate blister card is selected from the plurality of intermediate blister cards, the second intermediate blister card comprising a plurality of tablets of a second product stored within a second plurality of intermediate blisters. The second intermediate blister card is loaded into the filling machine at a location opposite the transfer fixture from the multi-dose blister card. The press of the filling machine is actuated again into engagement with the second plurality of intermediate blisters of the second intermediate blister card. The tablets are then transferred from the second plurality of intermediate blisters of the second intermediate blister card, through the plurality of passageways of the transfer fixture, and into the plurality of multi-dose blisters of the multi-dose blister card, such that at least one of the multi-dose blisters contains one tablet of the first product and one tablet of the second product.

DETAILED DESCRIPTION

Although the following text sets forth a detailed description of numerous different embodiments, it should be understood that the legal scope of the invention is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
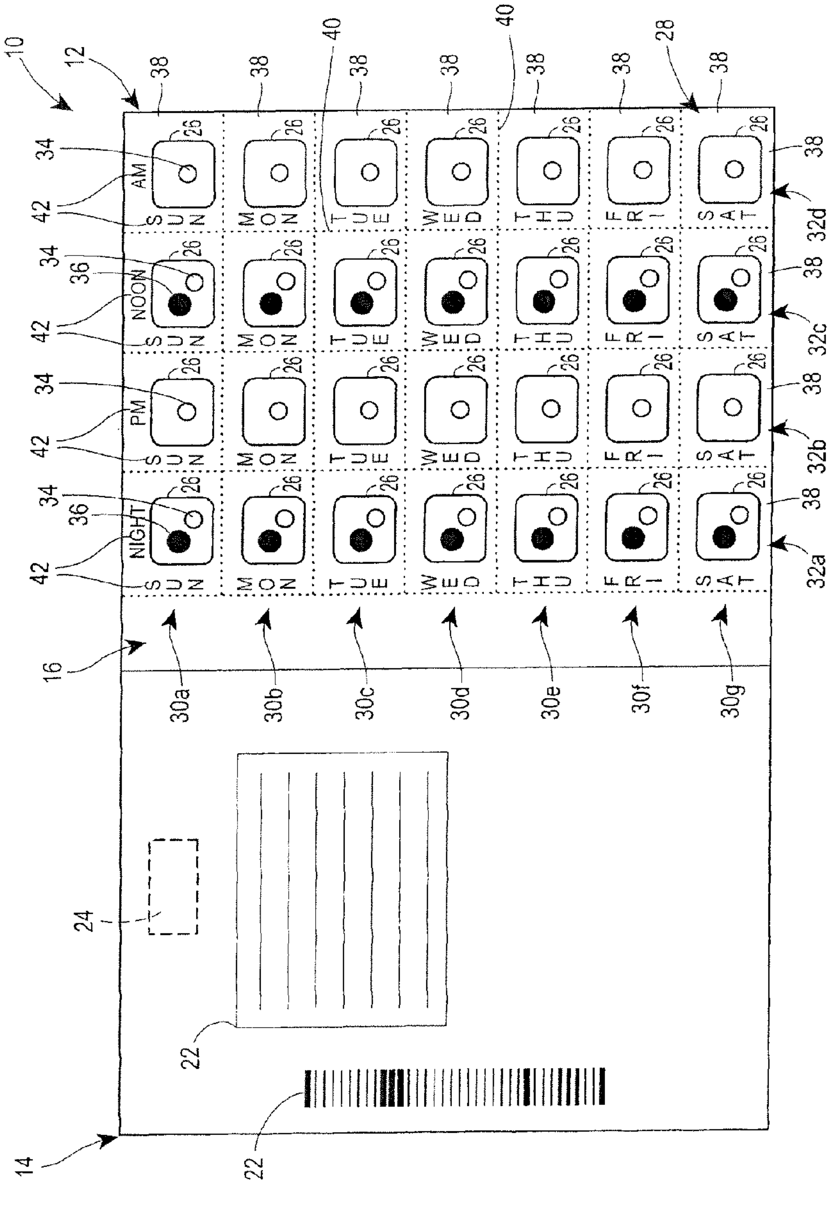
FIG. 1 is a plan view of one embodiment of a product package constructed in accordance with the principles of the present invention including a multi-dose blister card.

FIG. 1 depicts one embodiment of a product package 10 constructed in accordance with one embodiment of the present invention. The product package 10 generally includes a multi-dose blister card 12 and a cover 14, connected by a spine 16. In one practical application, the multi-dose blister card 12 is adapted to contain products such as prescription drugs, vitamins, or any other prescribed, over-the-counter, or non-medicinal product, for example, for storage and ingestion by an individual such as a patient. The cover 14 and spine 16 allow the package 10 to be closed similar to a book and may also contain identification information related to a prescription, the product stored in the multi-dose blister card 12, and/or the patient. It is noted that numerous alternative designs for the product package exist, such as, for example, a tri-fold design or a wallet style, where the blisters are arranged to nest with one another when the package is folded.

In the disclosed embodiment, the cover 14 includes an inside surface 18 carrying a patient identification label 20 and a product information storage device 22. The product information storage device 22 may include, for example, a bar code or a radio frequency identification (RFID) tag. Additionally, the depicted embodiment of the package 10 may include a timer 24 such as an electronic timer for signaling to a patient, for example, when to take his/her medication. The timer 24 is depicted in phantom in FIG. 1 such that it may be understood that the timer 24 may be retained between multiple plies of the material forming the cover 14 such that a visual indicator such as a blinking light may be disposed on an outside surface of the cover 14. In another embodiment, the timer 24 may include an audible indicator such as a speaker for emitting a beep, for example. Although not depicted, it should be appreciated that alternative embodiments of the package 10 may include either or both of the patient identification label 20 and the product information storage device 22 on an outside surface of the cover 14. So configured, such information may be readily attainable without having to open the cover 14.

The multi-dose blister card 12 of the package 10 depicted in FIG. 1 includes a plurality of blisters 26 arranged in a matrix 28. Additionally, the multi-dose blister card 12 includes a removable foil-backing material (not shown) on the backside of the blister card 12 to seal the blisters 26. The matrix 28 of the embodiment depicted in FIG. 1 includes a four-by-seven matrix, signifying the seven days of the week and four times of the day. More particularly, the matrix 28 includes seven rows 30*a*-30*g*, each row assigned to one day of the week, i.e., "Sunday," "Monday," "Tuesday," "Wednesday," "Thursday," "Friday," and "Saturday." Additionally, the matrix 28 includes four columns 32*a*-32*d*, each column assigned to a distinct time of the day, i.e., "AM," "Noon," "PM," and "Night."

Accordingly, the multi-dose blister card 12 of FIG. 1 includes twenty-eight blisters 26, each containing a specified dose of one or more drugs for ingestion on that particular day, at that particular time. For example, as depicted, the blister 26 located at row 30*a* and column 32*d*, which corresponds to "Sunday," "AM," includes a single tablet 34. Thus, the patient that has been prescribed the multi-dose blister card 12 knows to ingest tablet 34 during the "AM" or morning on "Sunday." In contrast, blister 26 located at row 30*a* and column 32*c*, which corresponds to "Sunday," "Noon," includes one tablet 34 and one table 36. Accordingly, the patient knows to ingest tablet 34 and tablet 36 at "Noon" or with lunch, on "Sunday." The multi-dose blister card 12 depicted in FIG. 1 is only one example of how various drugs may be stored for a particular patient. It should be appreciated that the blisters 26 of the multi-dose blister card 12 may contain generally any number of tablets for ingestion by the particular patient, in accordance with generally any prescription(s). The only limitation on the number of tablets or variations of prescriptions stored by the multi-dose blister card 12 is the size of the individual blisters 26. Nevertheless, it is foreseeable that the principles of the present invention may be applied to multi-dose blister cards having blister of generally any size and configuration.

Figure 4:
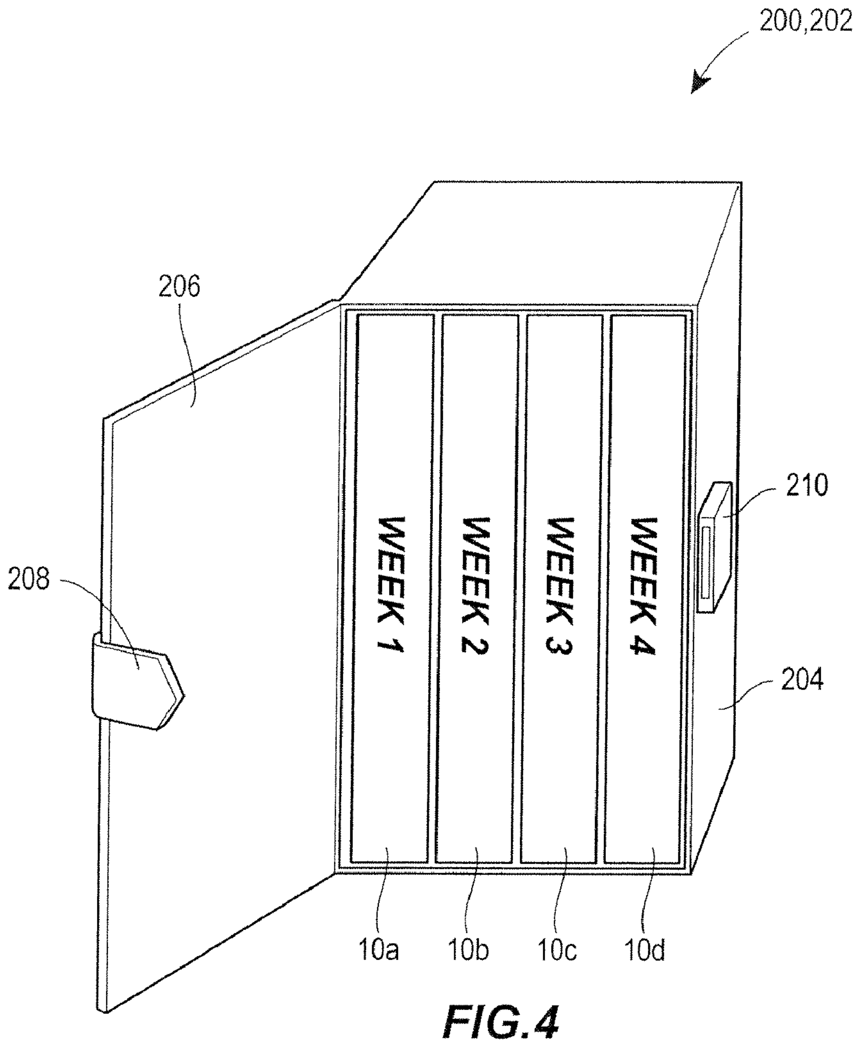
FIG. 4 is a perspective view of a child-proof storage container for use with multi-dose blister cards contrasted in accordance with one embodiment of the present invention.

Additionally, in the embodiment depicted in FIG. 1, the product package 10 is designed to contain one or more prescriptions for a single week, i.e., seven days. Thus, a patient with a prescription that lasts more than a week may require multiple product packages, where each package 10 is assigned to a particular week. FIG. 4 therefore depicts a system 200 for a patient to store multiple product packages 10*a*-10*d*, each package 10*a*-10*d* including a multi-dose blister card 12 constructed in accordance to the configuration depicted in FIG. 1. The system 200 includes a container 202 comprising a storage box 204 and a hinged door 206. The container 202 of the embodiment depicted in FIG. 4 is sized and configured to contain four packages 10*a*-10*d*, as depicted. However, alternative embodiments of the container 202 may be sized and configured to contain any number of product packages 10 as required for any particular patient's prescription(s). Additionally, the disclosed embodiment of the container 202 includes a childproof container 202. The door 206 includes a childproof latch mechanism 208 for latching a latch 210 disposed on the box 204.

With continued reference to FIG. 1, the multi-dose blister card 12 includes a plurality of cells 38 that constitute the rows 30*a*-30*g* and columns 32*a*-32*d* of the matrix 28. Thus, each cell 38 accommodates a single blister 26. Additionally, in the disclosed embodiment, each of the cells 38 may be separated by perforated seams 40. So configured, a patient may remove one or more of the cells 38 including the cells' 38 respective blisters 26 from the multi-dose blister card 12. This allows the patient to discard empty blisters 26 and/or to transport one or more blisters 26 without having to transport the entire package 10. Alternative embodiments may not include perforated seams 40.

Additionally, as depicted in FIG. 1, each cell 38 includes indicia 42 indicating to the patient when to ingest the tablets stored in the particular blister 26. For example, the blister 26 located at row 30*a* and column 32*d* includes indicia 42 identifying "SUN" for Sunday, and "Night" for night-time. The remaining cells 38 have similar indicia. Accordingly, in some embodiments of the present disclosure, while the multi-dose blister card 12 is unique for every patient, there may be many similarities from one patient's multi-dose blister card to the next. So configured, not necessarily every blister 26 must be filled for a specific prescription to be satisfied. For example, for a 6-day prescription that begins on Monday and ends on Saturday, the multi-dose blister card 12 would not include tablets stored in the blisters 26 for Sunday. For a 7-day prescription that begins on Monday and ends on Sunday, a patient would be given two packages 10. The multi-dose blister card 12 of the first package 10 would include tablets in the blisters 26 only for Monday through Saturday, while the multi-dose blister card 12 of the second package 10 would only include tablets in the blisters for Sunday, for example.

However, an alternative embodiment of the package 10 may include a customized multi-dose blister card 12 for each patient. For example, for a patient receiving a 7-day prescription that begins on Tuesday, for example, the indicia 42 on the multi-dose blister card 12 may be printed specific for that prescription. Thus, each cell 38 in the first row, which is identified by reference numeral 30*a* in FIG. 1, may be printed with indicia identifying Tuesday. Similarly, the second row 30*b* would include indicia identifying Wednesday, the third row 30*c* including indicia identifying Thursday, etc. The same type of customized indicia could also be applied to a specific dosing regime, i.e., the specific times of the day that the particular drugs are to be taken. For example, if a certain medication must be taken "With Breakfast," for example, the cells 38 in column 32*d* may include indicia reflecting such a prescription.

Figure 2:
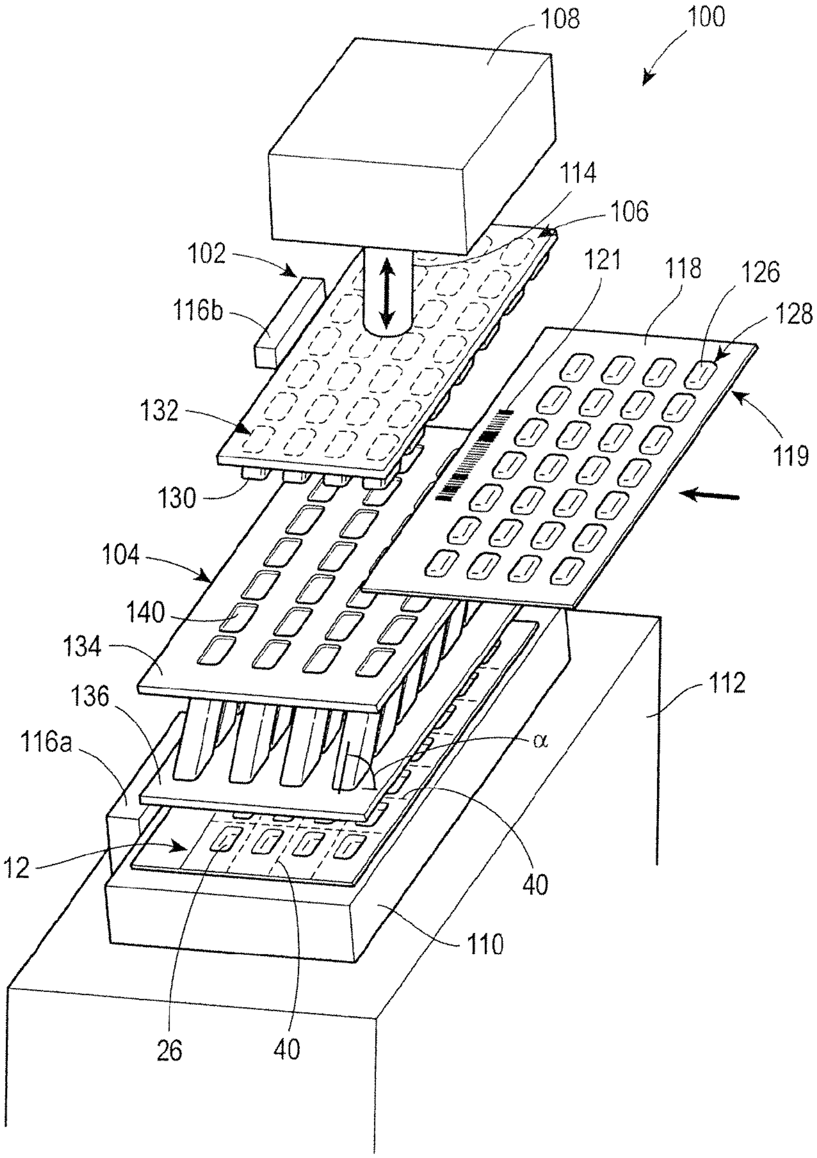
FIG. 2 is a perspective view of a system for filling multi-dose blister cards constructed in accordance with one embodiment of the present invention.
Figure 3:
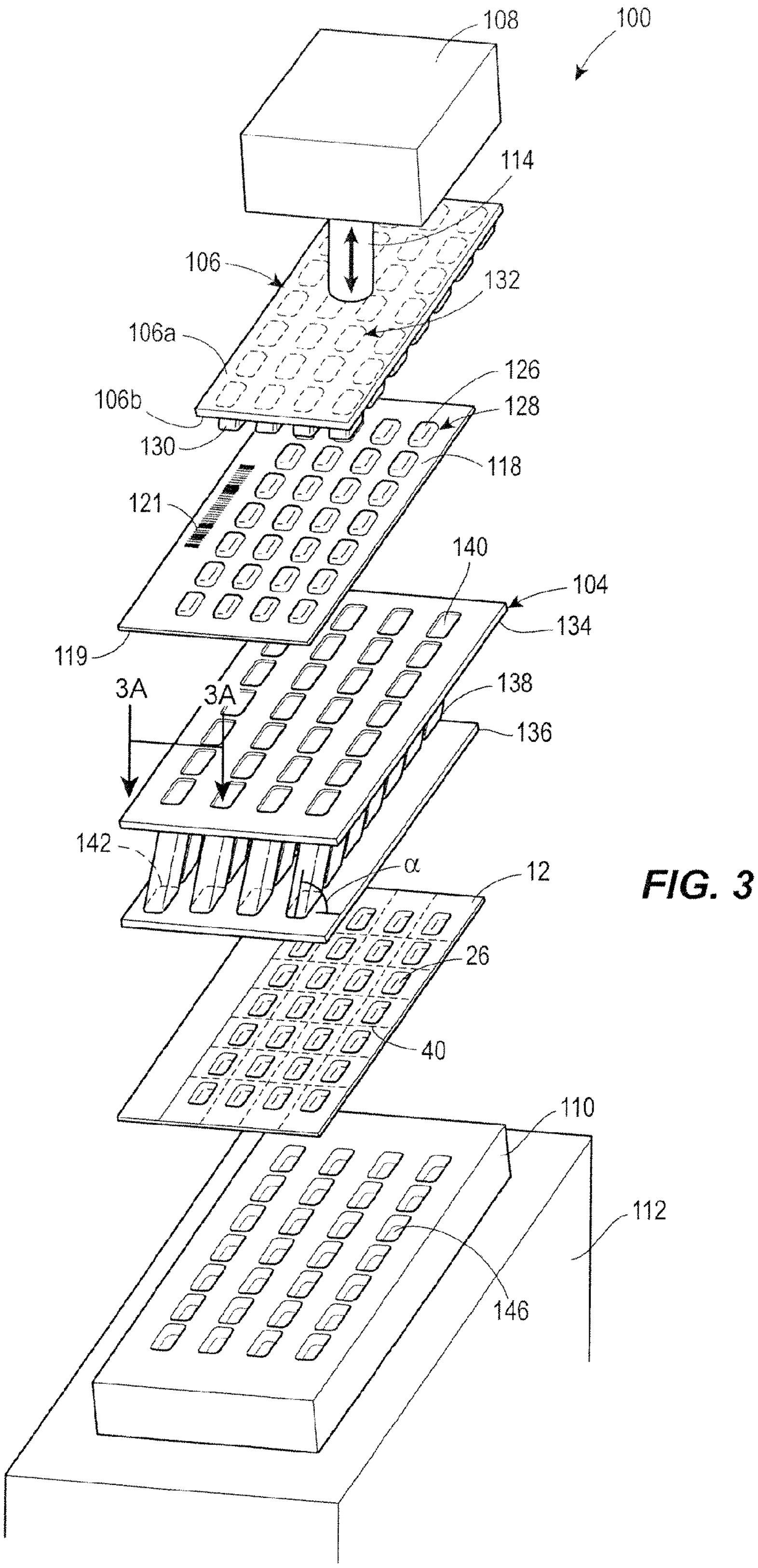
FIG. 3 is an exploded perspective view of the system of FIG. 2.

With reference now to FIGS. 2 and 3, one embodiment of a filling machine 100 for preparing prescriptions in accordance with the present disclosure may be described. The filling machine 100 depicted in FIGS. 2 and 3 may be described as being used to fill the product package 10 of FIG. 1, and more particularly, the multi-dose blister card 12 of FIG. 1.

The filling machine 100 generally comprises a press 102 and a transfer fixture 104. The press 102 and the transfer fixture 104 are utilized in combination with one or more intermediate cartridges 118 to fill the appropriate blisters or cells 26 of the multi-dose blister card 12, which is shown in FIG. 3, but not FIG. 2. In some embodiments, the intermediate cartridges may take the form of intermediate cards, which generally have a flat configuration (e.g., resembling a card). In some embodiments, the intermediate cartridges 118 may be shaped similarly to the blister card. The press 102 includes a press plate 106, an actuator 108, and a blister card tray 110. In the disclosed embodiment, the blister card tray 110 is supported on a vibrating table 112, such as a shaker table. The press plate 106 is operably connected to the actuator 108 via a piston 114. The actuator 108 may include a manual actuator, a mechanical actuator, an electromechanical actuator, or any other type of actuator capable of moving the press plate 106 up and down in accordance with an input. For example, the actuator 108 may include a motor, a hydraulic cylinder, a pneumatic cylinder, etc. Additionally, as depicted in FIG. 2, for example, the filling machine 100 may include first and second identifying devices 116*a*, 116*b* for reading (scanning) information during various stages of the process, as may be described. The identifying devices 116*a*, 116*b* (and other identifying devices, scanning devices, or sensing devices described herein) may include barcode scanners or radio frequency identifier (RFID) devices, for example. The identifying devices may include mechanical sensors that read (scan) physical imprints (e.g., of registration keys or other identifiers) or other mechanical or physical forms of identification. As depicted, the transfer fixture 104 is disposed between the press plate 106 and the blister card tray 110 during use. The transfer fixture 104 is adapted to transfer tablets from one or more intermediate cards 118 to the multi-dose blister card 12, as may be described.

The intermediate cards 118 generally include single-dose blister cards. For example, in the embodiment depicted in FIGS. 2 and 3, the intermediate blister card 118 includes a blister card having twenty-eight blisters 126 arranged in a four-by-seven matrix 128, which is similar to the four-by-seven matrix 28 of the multi-dose blister card 12 described above with reference to FIG. 1. Additionally, similar to the multi-dose blister card 12 described above, the intermediate card 118 includes a foil or paper backing material, which is identified with reference numeral 119 and facing downward in FIGS. 2 and 3, for example, and a tablet identifier device 121 such as a barcode or an RFID tag. For a specific prescription that requires a patient to ingest one tablet four times per day, each of the twenty-eight blisters 126 of the intermediate card 118 would contain a single tablet. Such an intermediate card 118 may contain tablets 34 illustrated in FIG. 1, for example. However, intermediate cards 118 configured in accordance with an alternative prescription may not include a tablet in each blister 126. Rather, in accordance with a prescription illustrated by tablets 36 in FIG. 1, for example, only two columns of the matrix 128 of the intermediate card 118 would contain the tablets 36.

Notwithstanding the number or configuration of tablets stored in the intermediate card 118, the intermediate card 118 is positioned above the transfer fixture 104 with the blisters 126 facing upward, relative to the orientation of FIGS. 2 and 3, during operation of the filling machine 100. In contrast, the multi-dose blister card 12 is positioned on top of the blister card tray 110, with the blisters 26 facing downward. So configured, the actuator 108 may be operated to drive the press plate 106 downward, thereby pushing the tablets stored in the intermediate card 118 out of their respective blisters 126, through the transfer fixture 104, and into the appropriate blisters 26 of the multi-dose blister card 12.

More specifically, and with continued reference to FIG. 3, the press plate 106 includes a generally flat plate constructed of metal or some other rigid material. The press plate 106 includes a top surface 106*a* and a bottom surface 106*b*. The top surface 106*a* is rigidly attached to the piston 114. The bottom surface 106*b* includes a plurality of cleats 130 extending downward from the press plate 106, relative to the orientation of FIG. 3. The cleats 130 are arranged in a matrix 132, which is illustrated in phantom in FIG. 3, for example, that corresponds to the matrices 28 and 128 of the blisters 26 and 126 of the multi-dose blister card 12 and intermediate card 118, respectively. In the disclosed embodiment, the cleats 130 include protrusions having generally square or rectangular cross-sections sized and configured to engage the blisters 126 of the intermediate cards 118. However, alternative embodiments of the cleats 130 may be shaped, sized, and configured in accordance with generally any cross-sectional shape capable of serving the principles of the present invention.

The transfer fixture 104 of the embodiment depicted in FIG. 3 includes a top plate 134, a bottom plate 136, and a plurality of feed tubes 138. The top plate 134 is generally parallel to the bottom plate 136. The top plate 134 includes a plurality of inlet apertures 140 and the bottom plate 136 includes a corresponding plurality of outlet apertures 142. In some embodiments, the plurality of feed tubes 138 are rigidly connected to the top and bottom plates 134, 136 between the inlet and outlet apertures 140, 142. Accordingly, the feed tubes 138 define a plurality of passageways that provide for communication between the inlet and outlet apertures 140, 142. The inlet and outlet apertures 140, 142, and therefore the feed tubes 138, are arranged in matrices corresponding to the matrices 28, 128 of the multi-dose blister card 12 and the intermediate card 118. Specifically, the inlet apertures 140, the outlet apertures 142, and the feed tubes 138 are arranged into four columns and seven rows. Other configurations may be possible in some embodiments Additionally, in some embodiments, the inlet apertures 140 in the top plate 134 are laterally offset from the outlet apertures 142 in the bottom plate 136 such that the feed tubes 138 extend at an angle $\alpha$ that is less than ninety-degrees between the top and bottom plates 134, 136. In some embodiments, the angle $\alpha$ is between approximately eighty degrees (80°) and approximately eighty-nine degrees (89°), for example. However, the angle $\alpha$ may ultimately be any angle less than ninety-degrees to serve the principles of the present invention. So configured, friction is generated between the tablets traveling through the passageways of the feed tubes 138, thereby controlling the loading of the tablets into the multi-dose blister card 12 by regulating the speed of the tablets. This ensures that the tablets are loaded into the proper blisters 26 and do not bounce out upon loading. In some embodiments, the feed tubes 138 may be constructed of a material that assists with this friction generating function. For example, in some embodiments, the feed tubes 138 may be constructed of a plastic material or a metal material.

Figure 3A:
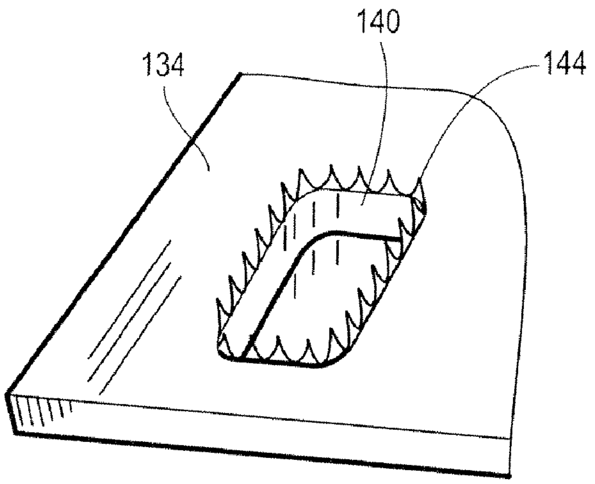
FIG. 3A is a partial perspective view of the system of FIGS. 2 and 3 taken from the perspective of line 3A-3A of FIG. 3.

Furthermore, as depicted in FIG. 3A, each of the inlet apertures 140 in the top plate 134 of the transfer fixture 140 includes a plurality of teeth 144. In the embodiment of FIG. 3A, the teeth 144 extend upward from the top plate 134 and completely around the perimeter of each of the inlet apertures 140. In other embodiments, the teeth 144 may only extend around select portions of the perimeters of the inlet apertures 140. Thus, the teeth 144 are adapted to perforate the backing 119 of the intermediate card 118 within each of the blisters 126 during operation of the filling machine 100. Such perforation ensures that the backing 119 tears in a controlled manner and does not fully tear off of the intermediate card 118. This facilitates the pushing of the tablet or tablets out of each of the blisters 126 without crushing the tablet(s). Additionally, the teeth 144 control the tearing of the backing 119 to prevent the backing 119 from breaking off into pieces and falling into the transfer fixture 104 and/or the multi-dose blister card 12. Accordingly, as may be described more fully below, the teeth 144 advantageously assist the filling machine 100 in pressing the tablets out of the intermediate card 118 and loading the multi-dose blister card 12 in a single step, e.g., generally simultaneously.

Referring back to FIG. 3, the blister tray 110 of the filling machine 100 generally comprises a metal plate defining a plurality of cavities 146. The cavities 146 are arranged and configured to receive the plurality of blisters 26 of the multi-dose blister card 12. The cavities 146 are therefore arranged in a matrix that is generally identical to the matrix 28 of the blisters 26. The cavities 146 may be generally identical in size to the blisters 26 to ensure proper alignment of the multi-dose blister card 12 during operation of the filling machine 100. However, alternative embodiments may include a blister tray 110 having cavities 146 of a size adapted to accommodate various sizes of blisters 26. So configured, the filling machine 100 may also include an additional device for ensuring the proper alignment of the multi-dose blister card 12. For example, in some embodiments, the bottom plate 136 of the transfer fixture 104 may include a flange extending around a periphery thereof for engaging the perimeter of the multi-dose blister card 12. Finally, as mentioned above, the blister tray 110 of the disclosed embodiment is supported by the vibrating table 112. The blister tray 110 may be fixed to the vibrating table 112 by generally any means such as clamps, threaded fasteners, magnets, etc.

Based on the foregoing, it should generally be appreciated that each of the above-described components provide a simple system, machine, and method for loading a multi-dose blister card 12 with a variety of medications for a particular patient having a particular prescription. Specifically, during operation, a technician loads the multi-dose blister card 12 onto the blister tray 110. This is accomplished by placing the blister card 12 such that the blisters 26 are received within the cavities 146 of the blister tray 110. At this point, the blister card 12 is empty and does not include the backing 119. Therefore, the blisters 26 are free to accept tablets from above. It should be appreciated that while FIG. 3, for example, only depicts the multi-dose blister card 12, in practice, the multi-dose blister card 12 would also include a cover 14 and a spine 16 attached thereto, although away from interfering with the operation of the filling machine 100.

With the blister card 12 in place, the technician places the transfer fixture 104 in the filling machine 100 such that the outlet apertures 142 in the bottom plate 136 are aligned with the open blisters 26 in the blister card 12. In some embodiments, the filling machine 100 then raises the blister tray 110 and the multi-dose blister card 12 up to the bottom plate 136 of the transfer fixture 104. In such an embodiment, the transfer fixture 104 could be provided within a rack (not shown) or some other carrier assembly (not shown) that forms part of the filling machine 100.

The technician then retrieves a particular tote corresponding to the prescription associated with the blister card 12, if the tote has not already been retrieved. The tote will contain a number of pre-picked intermediate cards 118 that are sequenced in an appropriate order for the press. The pre-picking of intermediate cards 118 to a tote for delivery or retrieval by a press operator greatly increases the efficiency of the overall system and method by allowing standard intermediate cards to be sequenced in a correct order and placed in a tote.

Next, the technician selects a first intermediate card 118 from a tote (or from a bin if a tote has not been pre-picked) containing a first drug in accordance with the patient's prescription. For example, in the disclosed embodiment, the first intermediate card 118 may include one tablet in each of the twenty-eight blisters 126, representing that the patient must take the prescription four times per day. The technician may identify the specific intermediate card 118 from a supply of many intermediate cards stored in a shelving system or a drawer loading system, for example. In some embodiments, the technician simply identifies the appropriate intermediate card 118 and scans the product identifier device 121, which may include a barcode or an RFID tag. Alternatively, the system could be configured to automatically scan the intermediate card 118 (or a bar code, etc. on the intermediate card 118) to perform a safety check. Once scanned, a computer, for example, may indicate whether or not the proper intermediate card 118 has been selected (described further below). In an alternative embodiment, the technician may make use of generally any kind of inventory control system such as that which is disclosed in U.S. Patent Application Publication No. 2002/0088231 A1, entitled "Method and Apparatus For Filling Stock Orders," which is assigned to the same assignee as the present application and incorporated herein by reference in its entirety.

With the proper intermediate card 118 selected, the technician then places the intermediate card 118 on the top plate 134 of the transfer fixture 104 such that the backing material 119 engages the teeth 144 partially surrounding the inlet apertures 140 and the blisters 126 face up. The technician then actuates the actuator 108 to apply a downward force to the press plate 106 via the piston 114. As the cleats 130 engage the blisters 126 of the intermediate card 118, the teeth 144 on the top plate 134 of the transfer fixture 104 perforate the backing material 119 of the intermediate card 118. Continued movement of the press plate 106 causes the cleats 130 to collapse the blisters 126 into engagement with the tablets, which in turn, pushes the tablets through the backing material 119. As mentioned above, the teeth 144 provided on the top plate 134 of the transfer fixture 104 cut the backing material 119 in a calculated manner to advantageously provide a clean cut to reduce the possibility of pieces of the backing material 119 breaking off and falling into the transfer fixture 104 and/or the multi-dose blister card 12. Additionally, because the teeth 144 surround less than the entirety of the inlet apertures 140, a portion of the backing material 119 adjacent the blisters 126 may remain attached to the intermediate card 118, thereby further reducing the possibility of the backing material 119 breaking off. Thus, as described, the filling machine 100 provides for cutting the backing material with the teeth 144 and pushing the tablets out of the intermediate card 118 in a single step, e.g., generally simultaneously.

Once the cleats 130 push the tablets out of the first intermediate card 118, the tablets fall through the corresponding feed tubes 138 of the transfer fixture 104. As stated above, the feed tubes 138 may be disposed at an angle α relative to the top and bottom plates 134, 136 such that the tablets slide against the inside surfaces of the feed tubes 138, thereby generating some amount of friction. This friction serves to slow the travel of the tablets. Therefore, the tablets exit the feed tubes 138 and are safely deposited into the corresponding blisters 26 of the multi-dose blister card 12. As stated above, for the purposes of explanation, the first intermediate card 118 may include tablets in each of the twenty-eight blisters 126. Therefore, the multi-dose blister card 12 is loaded with a tablet in each of its twenty-eight blisters. This may be illustrated by the tablets identified by reference numeral 34 in FIG. 1, for example.

With the first intermediate card 118 emptied into the multi-does blister card 12, the technician removes the intermediate card 118 from the top plate 134 of the transfer fixture. If the instant prescription requires a second prescription to be loaded into the multi-dose blister card 12, the technician then retrieves the next intermediate card in order in the tote. Alternatively, the technician may return to the inventory storage system and retrieve a second intermediate card 118 containing the second prescription if a tote was not pre-picked. The second prescription may or may not require the patient to ingest a specific medication as often as the first prescription. The intermediate card 118 containing the second prescription may reflect the frequency at which the second prescription is to be ingested. For example, the second prescription may include a medication that is to be ingested twice daily, once at "Noon" and once at "Night." This may be illustrated by the tablet identified by reference numeral 36 in FIG. 1, for example. Accordingly, the intermediate card 118 containing such a second prescription would only include fourteen tablets, and more particularly, two columns of seven tablets, where the filled columns of the intermediate card 118 correspond to columns **32*b* and 32*d* of the blister card 12 depicted in FIG. 1**.

Once the technician retrieves the proper intermediate card 118 for the second prescription, the card 118 may be loaded into the filling machine 100. Specifically, the intermediate card 118 is positioned on top of the top plate 134 of the transfer fixture 104 with the blisters 126 facing the cleats 130 of the press plate 106. The intermediate card 118 may then be scanned by the operator to ensure that the appropriate card corresponding to the prescription was selected by the operator, or the intermediate card 118 may be automatically scanned when it is placed in the transfer fixture 104. Thereafter, the technician may operate the filling machine 100 in a manner identical to that described above for depositing the tablets 36 into the multi-dose blister card 12 in a single step, e.g., generally simultaneously. At this point, the second intermediate card 118 is removed from the filling machine 100. If more prescriptions are required for filling the particular multi-dose blister card 12 for the particular patient, it should be appreciated that the technician may implement additional prescriptions via additional intermediate cards 118 in the same fashion as that just described. However, upon the technician completely filling the multi-dose blister card 12 for the particular patient, the technician swings the blister tray 110 out of the way where the multi-dose blister card 12 can be placed into or accessed by a heat sealer to apply and seal the foil backing material 19 thereto. In some embodiments, other sealing methods may be used, such as self-adhesive backed foil. In some embodiments, the transfer fixture 104 may need to be removed before swinging the blister tray 110 out of the way.

Alternatively, the technician may remove the multi-dose blister card 12 from the filling machine 100. From here, the cover 14 of the package 10 including the blister card 12 (depicted in FIG. 1) may be labeled with the patient identification label 20. In an alternative device and process, the filling machine 100 may include an electromechanical arm, for example, for automatically raising the blister card 12 out of the blister tray 110 and delivering it to a labeling machine and/or the heat sealer. Furthermore, it should be appreciated that during the above-described loading process, the vibrating table 112 depicted in FIG. 2 of one embodiment intermittently, continuously, or otherwise vibrates the multi-dose blister card 12. The vibrating helps when each blister 26 of the blister card 12 includes more than one tablet such that the multiple tablets can be vibrated and spread out within the blisters 26 to prevent a pile from forming, which can interfere with the deposition of additional tablets.

Although not specifically depicted in the figures, the filling machine 100 may include various elements for containing and aligning the components thereof, as well as the intermediate cards 118 and the multi-dose blister card 12. For example, in some embodiments, the filling machine 100 may include one or more sidewalls extending the height of the filling machine 100 from the blister tray 110 to the press plate 106. The sidewalls may include ledges or pins, for example, for supporting any one of the blister tray 110, the transfer fixture 104, and the intermediate and multi-dose blister cards 118, 12. Additionally, the sidewall may support the first and second identifying devices 116*a*, 116*b*, which are depicted in FIG. 2. Thus, it should be appreciated that various modifications and alterations of the example of the filling machine 100 and the process of using the filling machine 100 to fill the multi-dose blister card 12 are intended to be within the scope of the present invention.

Figure 5:
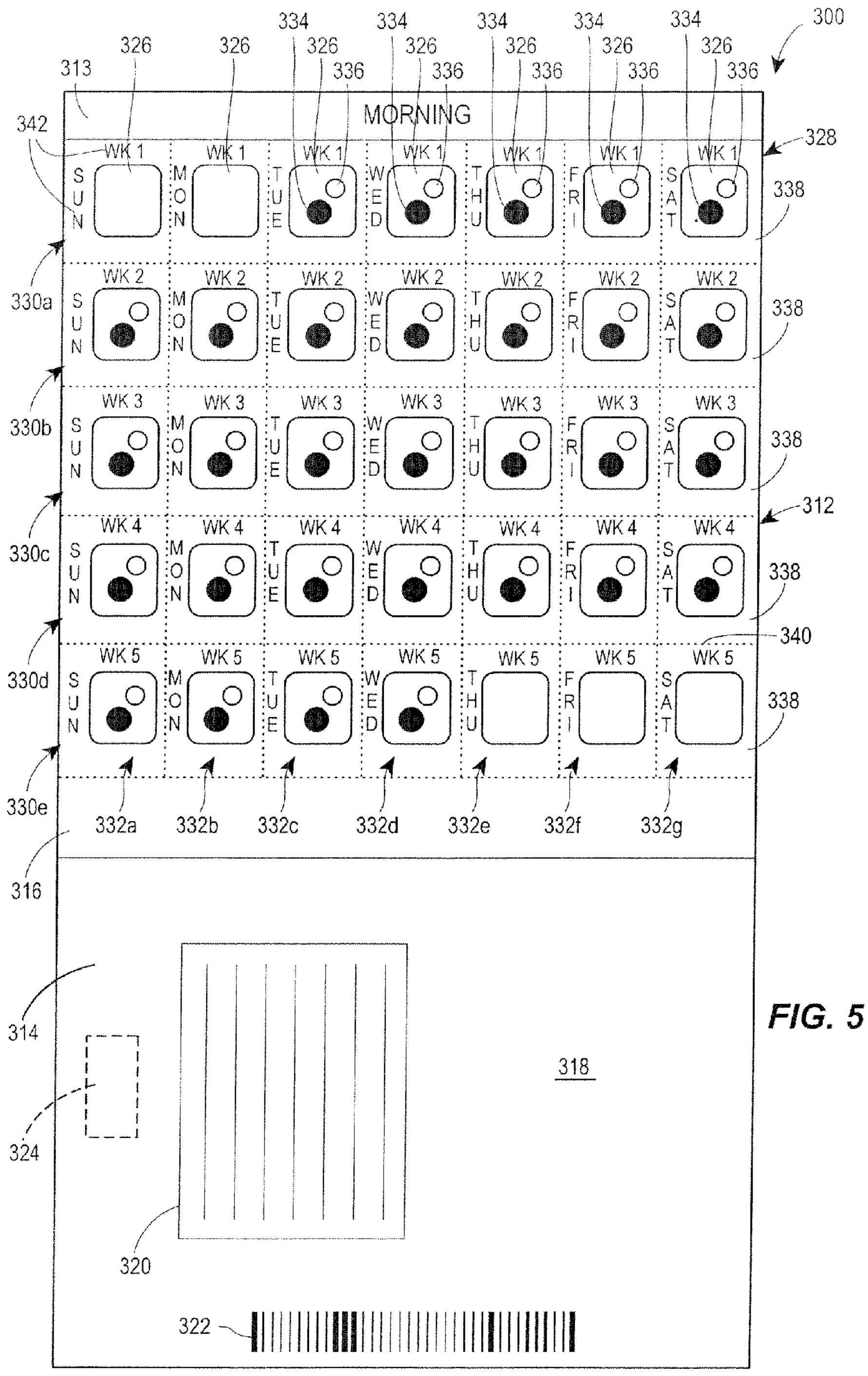
FIG. 5 is a plan view of another embodiment of a product package constructed in accordance with the principles of the present invention including a multi-dose blister card.

For example, FIG. 5 depicts an alternative product package 300 including an alternative multi-dose blister card 312 in accordance with the principles of the present invention. Additionally, FIG. 6 depicts an alternative filling machine 400 for filling the multi-dose blister card 312 depicted in FIG. 5.

The product package 300 depicted in FIG. 5 is similar to the product package 10 described above with reference to FIG. 1 in that it includes a multi-dose blister card 312, a cover 314, and a spine 316. Additionally, the multi-dose blister card 312 is similar to the multi-dose blister card 12 described above with reference to FIG. 1 in that it includes a matrix 328 of blisters 326.

The cover 314 includes an inside surface 318 carrying a patient identification label 320 and a product information storage device 322. The product information storage device 322 may include, for example, a bar code or a radio frequency identification (RFID) tag. Additionally, the depicted embodiment of the package 300 may include a timer 324 such as an electronic timer for signaling to a patient, for example, when to take his/her medication. The timer 324 is depicted in phantom such that it may be understood that the timer 324 may be retained between multiple plies of the material forming the cover 314 such that a visual indicator such as a blinking light may be disposed on an outside surface of the cover 314. In another embodiment, the timer 324 may include an audible indicator such as a speaker for emitting a beep, for example. Although not depicted, it should be appreciated that alternative embodiments of the package 300 may include either or both of the patient identification label 320 and the product information storage device 322 on an outside surface of the cover 314. So configured, such information may be readily attainable without having to open the cover 314.

The multi-dose blister card 312 of the package 300 depicted in FIG. 5 includes a plurality of blisters 326 arranged in a matrix 328, as mentioned. Additionally, the multi-dose blister card 312 includes a foil-backing material (not shown) on the backside of the blister card 312 to seal the blisters 326. The matrix 328 of the embodiment depicted in FIG. 5 includes a five-by-seven matrix, as opposed to the four-by-seven matrix 28 depicted in FIG. 1. The five-by-seven matrix 328 of the multi-dose blister card 312 therefore includes a blister 326 for each of the seven days of the week, for five weeks. More particularly, the matrix 328 includes first through fifth rows 330*a*-330*e*, each row assigned to a particular week, i.e., "Wk. 1," Wk. 2," etc. Additionally, the matrix 328 includes first through seventh columns 332*a*-332*g*, each column assigned to a day of the week, i.e., "Sunday," "Monday," "Tuesday," etc. Accordingly, the embodiment of the multi-dose blister card 312 depicted FIG. 5 includes thirty-five blisters 326, each containing a specified dose of one or more drugs for ingestion on that particular day of that particular week. For example, as depicted, the blister 326 located at the first row 330*a* and the second column 332*b*, which corresponds to "Monday," "Wk. 1," includes two tablets, one tablet including drug 334 and one tablet of drug 336.

Thus, the patient that has been prescribed the multi-dose blister card 312 knows to ingest both tablet 334 and tablet 336 on "Tuesday" of "Wk. 1." Additionally, in the disclosed embodiment, each of the blisters 326 of the multi-dose blister card 312 contain two tablets, one of medication 334 and one of medication 336. Accordingly, the patient has been prescribed the same dosage of the same medication(s) each day of the week. Further still, in the embodiment of the product package 300 disclosed in FIG. 5, the multi-dose blister card 312 includes a header 313 that is visible when the cover 314 is opened. The header 313 of the disclosed embodiment reads "Morning." Accordingly, the patient is instructed to take the medications prescribed within the instant multi-dose blister card 312 in the morning. The same patient may also include additional product packages 300 for different times of the day. For example, a particular patient may have a separate product package 300 generally identical to or different than the product package 300 depicted in FIG. 5 for Noon, Afternoon, and/or Night. So prescribed, the patient may also have a childproof storage container for storing the product packages 300 similar to the container 202 described above with reference to FIG. 4. It should therefore be appreciated that the multi-dose blister card 312 depicted in FIG. 5 is only one additional example of how various medications may be stored for a particular patient. It should be appreciated that the blisters 326 of the multi-dose blister card 312 may contain generally any number of tablets for ingestion by the particular patient, in accordance with generally any prescription. The only limitation on the number of tablets or variations of prescriptions stored by the multi-dose blister card 312 is the size of the individual blisters 326.

With continued reference to FIG. 5, the multi-dose blister card 312 includes a plurality of cells 338 that constitute the first through fifth rows 330*a*-330*e* and the first through seventh columns 332*a*-332*g* of the matrix 328. Thus, each cell 338 accommodates a single blister 326. Additionally, in the disclosed embodiment, each of the cells 338 may be separated by perforated seams 340. So configured, a patient may remove one or more of the cells 338 including the cells' 338 respective blisters 326 from the multi-dose blister card 312. This allows the patient to discard empty blisters 326 and/or to transport one or more blisters 326 without having to transport the entire package 300. Alternative embodiments may not include perforated seams 340.

Additionally, as depicted, each cell 338 includes indicia 342 indicating to the patient what day to ingest the tablets stored in the particular blisters 326. For example, the blister 326 located at the first row 330*a* and the fourth column 332*d* includes indicia 342 identifying "WED," "Wk. 1." The remaining cells 338 have similar indicia 342. Accordingly, in some embodiments of the present invention, each multi-dose blister card 312 provided to every patient includes identical indicia 342. So configured, not necessarily every blister 326 must be filled for a specific prescription to be satisfied. For example, for a 28-day prescription that begins on Monday and ends on Sunday, the multi-dose blister card 312 would not include tablets for "Sunday" of "Wk. 1," i.e., blister 326 located at the first row 330*a*, the first column 332*a*, or "Monday" through "Saturday" of "Wk. 5," i.e., blisters 326 located in the fifth row 330*e* in the second through seventh columns 332*b*-332*g*. FIG. 5 depicts the multi-dose blister card 312 containing medications according to such an example where the card 312 includes standard indicia and the loading of the blisters 326 is customized depending on the day of the week that the prescription is to begin. However, an alternative embodiment of the package 300 may include customized indicia 342 such that the cell 338 located row 330*a* and column 332*a* always identifies the first day of the prescription, regardless of whether it begins on Sunday, Monday, Tuesday, etc.

Figure 6A:
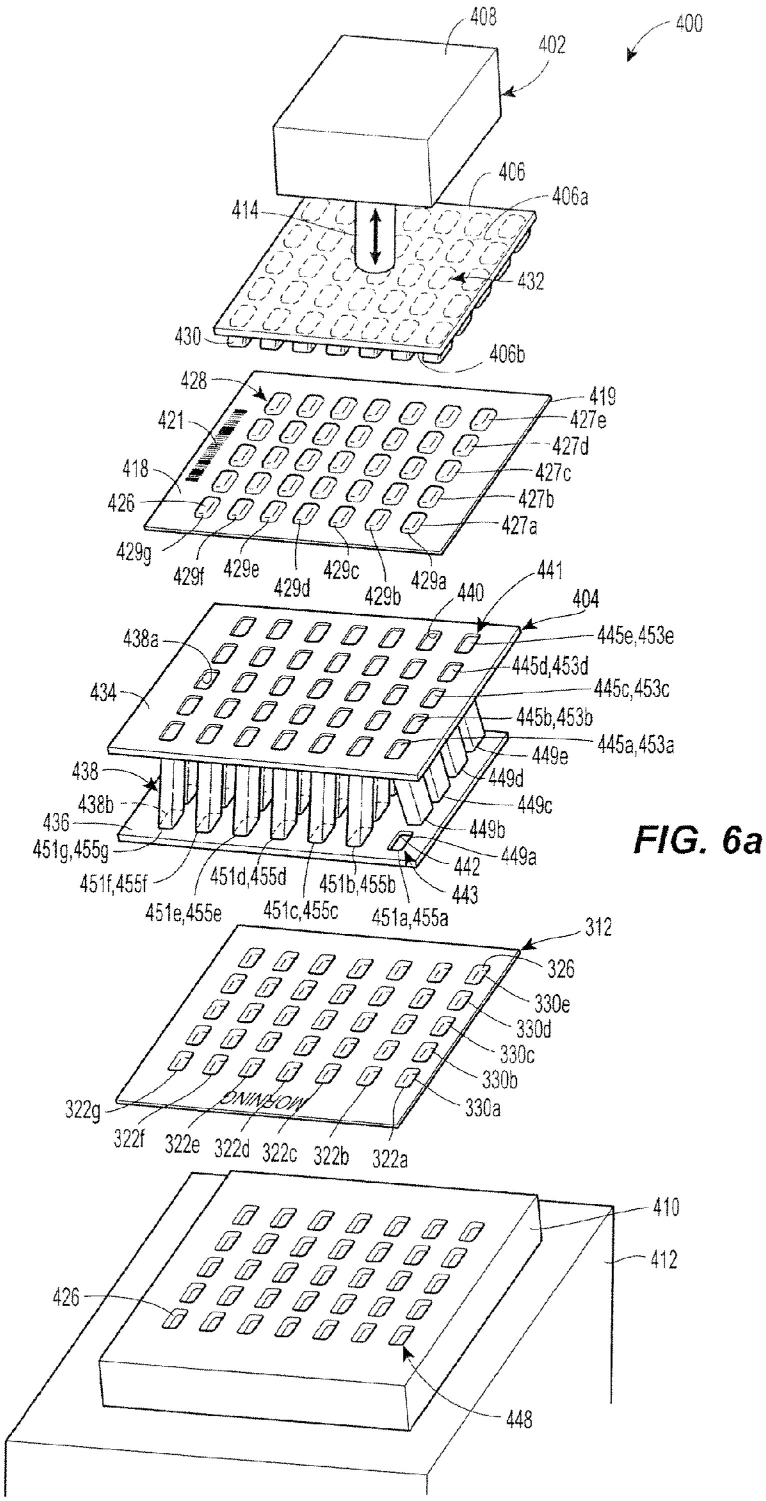
FIG. 6*a* is a perspective view of a system for filling multi-dose blister cards in accordance with an alternative embodiment of the present invention.

With reference now to FIG. 6*a*, one embodiment of a tilling machine 400 for preparing prescriptions in accordance with the product package 300 depicted in FIG. 5 may be described. Similar to the filling machine 100 described above with reference to FIGS. 2 and 3, the filling machine 400 depicted in FIG. 6*a* generally comprises a press 402 and a transfer fixture 404. However, as may be described more fully, the filling machine 400 utilizes a plurality of transfer fixtures 404, only one of which is depicted in FIG. 6*a* for explanatory purposes. Each of the transfer fixtures 404 for use with the filling machine 400 are uniquely, e.g., distinctly, configured for filling the multi-dose blister card 312 in accordance with a prescription that begins on a particular day.

Notwithstanding, the press 402 and the transfer fixture 404 are utilized in combination with one or more intermediate cards 418 to fill the appropriate blisters 326 of the multi-dose blister card 312 in a manner generally similar to the process described above with reference to the filling machine 100 depicted in FIGS. 2 and 3.

For example, the press 402 includes a press plate 406, an actuator 408, and a blister card tray 410. In the disclosed embodiment, the blister card tray 410 is supported on a vibrating table 412, such as a shaker table. The press plate 406 is operably connected to the actuator 408 via a piston 414. The actuator 408 may include a manual actuator, a mechanical actuator, an electromechanical actuator, or any other type of actuator capable of moving the press plate 406 up and down in accordance with an input. For example, the actuator 408 may include a motor, a hydraulic cylinder, a pneumatic cylinder, etc. Additionally, the filling machine 400 may include identifying devices such as identifying devices 116*a*, 116*b* depicted in FIG. 2 for reading information during various stages of the process. As depicted, the transfer fixture 404 is disposed between the press plate 406 and the blister card tray 410 during use. The transfer fixture 404 is adapted to transfer tablets from one or more intermediate cards 418 to the multi-dose blister card 312, as may be described.

The intermediate cards 418 generally include single-dose blister cards similar to the intermediate cards 118 described above in that the intermediate cards 418 include a plurality of blisters 426 and a foil backing material 419, which is facing down relative to the orientation of FIG. 6. However, in contrast to the intermediate card 418 described above, the intermediate cards 418 utilized in combination with the filling machine 400 of the present embodiment include thirty-five blisters 426 arranged in a five-by-seven matrix 428. The matrix 428 includes first through fifth rows 427*a*-427*e* and first through seventh columns 429*a*-429*g*, which correspond to the first through fifth rows 330*a*-330*e* and the first through seventh columns 332*a*-332*g* of the multi-dose blister card 312. Additionally, similar to the multi-dose blister card 312 described above, the intermediate card 418 may include a tablet identifier device 421 such as a barcode or an RFID tag.

For a specific prescription that requires a patient to ingest one tablet per day each day of the week, thirty of the thirty five blisters 426 of the intermediate card 418 would contain a single tablet. Such an intermediate card 418 may contain tablets 334 or 336 illustrated in FIG. 5, for example. More particularly, each blister within the first through fourth rows 427*a* through 427*d* would be filled with a tablet. Two of the blisters 426 in the fifth row 427*e* would be filled, and the remainder would be empty.

Notwithstanding the number or configuration of tablets stored in the intermediate card 418, the intermediate card 418 is positioned above the transfer fixture 404 with the blisters 426 facing upward, relative to the orientation of FIG. 6*a*, during operation of the filling machine 400. In contrast, the multi-dose blister card 312 is positioned on top of the blister card tray 410, with the blisters 326 facing downward. So configured, the actuator 408 may be operated to drive the press plate 406 downward, thereby pushing the tablets stored in the intermediate card 418 out of their respective blisters 426, through the transfer fixture 404, and into the appropriate blisters 326 of the multi-dose blister card 312.

Similar to the press plate 106 described above with reference to FIGS. 2 and 3, the press plate 406 includes a generally flat plate constructed of metal or some other rigid material. The press plate 406 includes a top surface 406*a* and a bottom surface 406*b*. The top surface 406*a* is rigidly attached to the piston 414. The bottom surface 406*b* includes a plurality of cleats 430 extending downward from the press plate 406, relative to the orientation FIG. 6*a*. The cleats 430 are arranged in a matrix 432, which is illustrated in phantom in FIG. 6*a*, for example, that corresponds to the matrix 428 of the blisters 426 of the intermediate card 418. In the disclosed embodiment, the cleats 430 include protrusions having generally square or rectangular cross-sections sized and configured to engage the blisters 426 of the intermediate cards 418. However, alternative embodiments of the cleats 430 may be shaped, sized, and configured in accordance with generally any cross-sectional shape capable of serving the principles of the present invention.

The transfer fixture 404 of the embodiment depicted in FIG. 6*a* is similar to the transfer fixture 104 described above with reference to FIGS. 2 and 3 in that the transfer fixture 404 includes a top plate 434, a bottom plate 436, and a plurality of feed tubes 438. The top plate 434 is generally parallel to the bottom plate 436 and may include a plurality of teeth extending upward therefrom, such as the teeth 144 depicted in FIG. 3A. The top plate 434 includes a plurality of inlet apertures 440 and the bottom plate 406 includes a corresponding plurality of outlet apertures 442. The inlet and outlet apertures 440, 442 are arranged in five-by-seven matrices 441, 443, which correspond to the five-by-seven matrices 328, 428 of the multi-dose blister card 312 and intermediate card 418. Specifically, the inlet apertures 440 include first through fifth rows 445*a*-445*e* and first through seventh columns 447*a*-447*g*. The outlet apertures 442 include first through fifth rows 449*a*-449*e* and first through seventh columns 451*a*-451*g*.

In contrast, however, the feed tubes 438 only include thirty feed tubes 438 arranged in first through fourth rows 453*a*-453*d* and first through seventh columns 455*a*-455*g*. Each of the feed tubes 438 defines a passageway extending between an inlet 438*a* and an outlet 438*b*. The inlets 438*a* of the first through fourth rows 453*a*-453*e* of the feed tubes 438 are attached to the first through fourth rows 445*a*-445*d* of the inlet apertures 440 in the top plate 434 of the transfer fixture 404. Additionally, the outlets 438*b* of the second through seventh columns 455*b*-455*g* of the feed tubes 438 are attached directly to the second through seventh columns 451*b*-451*g* of outlet apertures 442 in the bottom plate 436 of the transfer fixture 404. Thus, each of the feed tubes 438 in the second through seventh columns 455*b*-455*g* extend directly between corresponding inlet and outlet apertures 440, 442 in the top and bottom plates 434, 436 of the transfer fixture 404.

However, in the embodiment of the transfer fixture 404 depicted in FIG. 6*a*, the first column 455*a* of feed tubes 438 is configured differently. While the inlets 438*a* of the first column 455*a* of feed tubes 438 are connected to the first through fourth rows 445*a*-445*d* of inlet apertures 440 in the top plate 434, the outlets 438*b* are connected to the second through fifth rows 445*b*-445*e* of outlet apertures 442 in the bottom plate 436. Accordingly, the outlets 438*b* of the feed tubes 438 in the first column 455*a* of the embodiment of the transfer fixture 404 depicted in FIG. 6*a* are "offset" one row each. So configured, the outlet aperture 442 located in the first column 451*a* and first row 449*a* of the bottom plate 436 is not attached to a feed tube 438, as depicted, and thus, the blister 326 located in the first column 332*a* of the first row 330*a* of the multi-dose blister card 312 does not receive a tablet during loading. Rather, this configuration of the transfer fixture 404 loads the multi-dose blister card 312 in accordance with the scenario depicted in FIG. 5. Specifically, the prescription begins on "Mon." of "Wk. 1" and ends on "Sun." of Wk. 5." The blister 326 associated with "Sun." of "Wk. 1" is empty. Additionally, the blisters 326 associated with "Mon." through "Sat." of "Wk. 5" are empty in this disclosed embodiment.

It should, however, be appreciated that the filling machine 400 of one embodiment of the present invention may include a plurality of transfer fixtures 404, as mentioned above, whereby each of plurality of transfer fixtures 404 may be interchangeably disposed within the filling machine 400. FIG. 6*a* therefore only depicts one of the plurality of transfer fixtures 404 and may be considered the transfer fixture which is utilized for all prescriptions that begin on Monday, for example, as has been thus far described in combination with the multi-dose blister card 312 of FIG. 5. The filling machine 400 therefore includes a total of seven transfer fixtures 404, each transfer fixture uniquely configured for filling prescriptions that begin on a particular day of the week.

For example, as described above, the transfer fixture 404 for filling prescriptions that begin on Monday includes the outlets of the first column 455*a* of feed tubes 438 offset one row toward the back of the bottom plate 436, relative to the orientation of FIG. 6*a*. Similarly, a transfer fixture 404 for filling prescriptions that begin on Tuesday would include the outlets of the first and second columns 455*a* and 455*b* of feed tubes 438 offset one row toward the back of the bottom plate 436, relative to the orientation of FIG. 6*a*. A transfer fixture 404 for filling prescriptions that begin on Wednesday would include the outlets of the first, second, and third columns 455*a*, 455*b*, 455*c* of feed tubes 438 offset one row toward the back of the bottom plate 436, relative to the orientation of FIG. 6*a*. Transfer fixtures 404 configured for filling prescriptions that begin on Thursday, Friday, and Saturday would similarly include columns of offset feed tubes. In contrast, a transfer fixture 404 for filling prescriptions that begin on Sunday would not include offset feed tubes, but rather, each of the feed tubes 438 would extend between corresponding the first through fourth rows 445*a*-445*d*, 449*a*-449*d* of inlet and outlet apertures 440, 442 in the top and bottom plates 434, 436.

Additionally, in some embodiments, the inlet apertures 440 in the top plate 434 are laterally offset from the corresponding outlet apertures 442 in the bottom plate 436 such that the feed tubes 438 that extend between corresponding inlet and outlet apertures 440, 442 are disposed at an angle β. The angle β serves to generate friction with tablets passing therethrough in a manner similar to that described above with feed tubes 138 of the filling machine 100 depicted in FIGS. 2 and 3, which are disposed at the angle α. In some embodiments, the angle β is less than ninety-degrees and between approximately eighty degrees (80°) and approximately eighty-nine degrees (89°), for example. However, the angle β may ultimately be any angle less than ninety-degrees to serve the principles of the present invention. So configured, friction is generated between the tablets traveling through the feed tubes 438, thereby controlling the loading of the tablets into the multi-dose blister card 312 by regulating the speed of the tablets. This ensures that the tablets are loaded into the proper blisters 326 and do not bounce out upon loading. In some embodiments, the feed tubes 438 may be constructed of a material that assists with this friction generating function. For example, in some embodiments, the feed tubes 438 may be constructed of a plastic material or a metal material.

Still referring to FIG. 6*a*, the blister tray 410 of the filling machine 400 generally comprises a metal plate defining a plurality of cavities 446. The cavities 446 are arranged and configured to receive the plurality of blisters 326 of the multi-dose blister card 312. Specifically, in the disclosed embodiment, the cavities 446 are arranged in a five-by-seven matrix 448 that is generally identical to the matrix 328 of the blisters 326. The cavities 446 may be generally identical in size to the blisters 326 to ensure proper alignment of the multi-dose blister card 312 during operation of the filling machine 400. However, alternative embodiments may include a blister tray 410 having cavities 446 of a size adapted to accommodate various sizes of blisters 326. So configured, the filling machine 400 may also include an additional device for ensuring the proper alignment of the multi-dose blister card 312. For example, in some embodiments, the bottom plate 436 of the transfer fixture 404 may include a flange extending around a periphery thereof for engaging the perimeter of the multi-dose blister card 312. Finally, as mentioned above, the blister tray 410 of the disclosed embodiment is supported by the vibrating table 412. The blister tray 410 may be fixed to the vibrating table 412 generally by any means such as clamps, threaded fasteners, magnets, etc.

Based on the foregoing, it should generally be appreciated that each of the above-described components of the embodiment of the filling machine 400 and blister card 312 of the present embodiment of the invention provide a simple system, machine, and method for loading a multi-dose blister card 312 with a variety of medications for a particular patient having a particular prescription. Specifically, during operation, a technician loads the multi-dose blister card 312 onto the blister tray 410. This is accomplished by placing the blister card 312 such that the blisters 326 are received within the cavities 446 of the blister tray 446, as mentioned above. At this point, the blisters 326 of the blister card 312 are empty and the blister card 312 does not include the backing 319. Therefore, the blisters 326 are open and free to accept tablets from above. It should be appreciated that FIG. 6*a*, for example, only depicts the multi-dose blister card 312 including the header 313. However, in practice, the multi-dose blister card 312 would also include a cover 314 and a spine 316 attached thereto, although the cover 314 and spine 316 would be disposed away from interfering with the operation of the filling machine 400.

With the blister card 312 in place, the technician places the transfer fixture 404 in the filling machine 400 such that the outlet apertures 442 in the bottom plate 436 are aligned with the open blisters 326 in the blister card 312. In some embodiments, the filling machine 400 then raises the blister tray 410 and the multi-dose blister card 312 up to the bottom plate 436 of the transfer fixture 404 to prevent the pills from bouncing out of the blisters or between the blisters. Because the present embodiment of the filling machine 400 includes a plurality of transfer fixtures 404, each assigned to a particular day of the week, the filling machine 400 in some embodiments may include a transfer fixture identification device, which may include a device such as device 116*a* depicted in FIG. 2, for example. So equipped, the filling machine 400 via the transfer fixture identification device, may read fixture identification information such as a barcode or an RFID tag carried by the transfer fixture 404, or any other suitable electrical or mechanical devices, to ensure that the technician has selected the proper transfer fixture 404 for the particular prescription. In some embodiments, if the filling machine 400 identifies that the technician installed the wrong transfer fixture 404 into the machine, the filling machine 400 may generate an audible or visual indication reflecting such determination, for example, and may even prevent the actuator 408 from operating. On the contrary, if the filling machine 400 determines that the proper transfer fixture 404 has been installed, the filling machine 400 may generate an audible or visual indication reflecting such determination.

Next, the technician selects a first intermediate card 418 containing a first drug in accordance with a prescription to be filled. For example, in the disclosed embodiment, the first intermediate card 418 may include one tablet in each of the blisters 426 located in the first through fourth rows 445*a*-445*d* of the intermediate card 418. The fifth row 445*e* of blisters 426 would be partially empty. The technician may select the first intermediate card 418 from a supply of many intermediate cards 418 stored in a shelving system or a drawer loading system, for example. In some embodiments, the technician simply identifies the appropriate intermediate card 418 and scans the product identifier device 421 carried by the card 418, which may include a barcode or an RFID tag. Once scanned, a computer, for example, may indicate whether or not a correct intermediate card 418 has been selected for the instant prescription to be filled. In an alternative embodiment, the technician may make use of generally any kind of inventory control system such as that which is disclosed in U.S. Patent Application Publication No. 2002/0088231 A1, entitled "Method and Apparatus For Filling Stock Orders," which is assigned to the same assignee as the present application and incorporated herein by reference in its entirety. As discussed above, all of the required intermediate cards for a particular patient may be pre-picked and placed into a custom tote in the appropriate sequence for subsequent pressing.

With the correct first intermediate card 418 selected, the technician then places the first intermediate card 418 on the top plate 434 of the transfer fixture 404. The technician then actuates the actuator 408 to apply a downward force to the press plate 406 via the piston 414. The cleats 430 collapse the blisters 426 into engagement with the tablets, which in turn, pushes the tablets through the backing material 119. In an embodiment where the top plate 434 of the transfer fixture 404 includes teeth such as teeth 144 depicted in FIG. 3A, for example, the backing material 419 is perforated in a calculated manner to advantageously provide a clean cut, as described above in connection with FIG. 3A, thereby reducing the possibility of pieces of the backing material 419 breaking off and falling into the transfer fixture 404 and/or the multi-dose blister card 312. Thus, as described, the filling machine 400 provides for cutting the backing material with the teeth 144 and pushing the tablets out of the intermediate card 418 to load the multi-dose blister card 312 in a single step, e.g., generally simultaneously.

Once the cleats 430 push the tablets out of the first intermediate card 418, the tablets fall through the passageways of the corresponding feed tubes 438 of the transfer fixture 404. More specifically, the tablets stored in the second through seventh columns 429*b*-429*g* of blisters 426 in the intermediate card 418 are transferred through the second through seventh columns 455*b*-455*g* of feed tubes 438. Finally, these tablets are deposited into the second through seventh columns 332*b*-332*g* of the first through fourth rows 330*a*-330*d* of blisters 326 in the multi-dose blister card 312. Moreover, because the specific embodiment of the product package 300 depicted in FIG. 5 includes a prescription, as an example only, that begins on Monday, the tablets stored in the first column 429*a* of blisters 426 in the intermediate card 418 are transferred through the first column 455*a* of feed tubes 438, which are offset a single row, such that the tablets are deposited into the second through fifth rows 330*b*-330*e* of the first column 332*a* of blisters 326 of the multi-dose blister card 312. Accordingly, as depicted in FIG. 5, this configuration fills the multi-dose blister card 312 with the first medication 334, for example, to start on "Mon." of "Wk. 1" and end on "Sun." of "Wk. 5."

With the first intermediate card 418 emptied into the multi-dose blister card 312, the technician removes the first intermediate card 418 from the top plate 434 of the transfer fixture 404. If the instant prescription requires a second medication to be loaded into the multi-dose blister card 312, the technician then returns to the inventory storage system and retrieves a second intermediate card 418 containing the second medication. However, as noted above, the intermediate cards 418 may have been pre-picked and placed in a tote for increased efficiency of the press operator.

The second medication may or may not require the patient to ingest a specific medication as often as the first medication. The intermediate card 418 containing the second medication may reflect the frequency at which the second medication is to be ingested. In the example depicted in FIGS. 5 and 6*a*, the second medication includes tablets 336, for example, taken once per day, every day for twenty-eight days. Therefore, the technician operates the press 402 and the multi-dose blister card 312 is further filled with tablets 336, as depicted in FIG. 5, for example, in a manner identical to that just described for the tablets 334 of the first medication. It should be appreciated that the first and second intermediate cards 418, or a third, fourth, etc. intermediate cards 418 of the embodiment depicted in FIGS. 5 and 6*a*, may include a medication prescribed in accordance with generally any frequency over a twenty-eight day prescription, a thirty-day prescription, or even a thirty-five day prescription. For example, in the above-described embodiment, any particular prescription may require a third intermediate card 418, which may include a third medication, which is only intended to be ingested on alternating days of the week. Such a third intermediate card 418 would therefore only include tablets stored in the blisters 426 located in alternating columns such as columns 429*a*, 429*c*, and 429*e*, for example. Thus, it should be appreciated that the intermediate cards 418 may be arranged to store medications according to generally any prescription, and are not limited to the explicit examples provided herein.

Upon the technician completely filling the multi-dose blister card 312 for the particular patient, the technician removes the transfer fixture 404 and the multi-dose blister card 312 from the filling machine 400. However, in many situations, the technician may not need to remove the transfer fixture 404 between filling multi-dose blister cards for different patients, because the technician may fill multi-dose blister cards for several patients in a row that all require the same transfer fixture 404. This will greatly increase the overall efficiency of the process. From here, the cover 414 of the product package 300 may be labeled with the patient identification label 320. Additionally, the multi-dose blister card 312 may be placed into a heat sealer to apply and seal the foil backing material

419 thereto. In an alternative device and process, the filling machine 400 may include an electromechanical arm, for example, for automatically raising the blister card 312 out of the blister tray 410 and delivering it (or both the card 312 and the tray 410 together) to a labeling machine and/or the heat sealer. Furthermore, it should be appreciated that during the above-described process for filling the multi-dose blister card 312, the vibrating table 412 depicted in FIG. 6 of one embodiment may intermittently, continuously, or otherwise vibrate the multi-dose blister card 312 to prevent tablets from piling up in the blisters 326, which can interfere with the deposition of subsequent tablets.

While the embodiments of the multi-dose blister cards 12, 312 have been described herein as including matrices 28, 328 of blisters 26, 326, alternative embodiments of the product packages 10, 100 may be arranged according to generally any configuration. For example, an alternative configuration of the product packages 10, 100 and multi-dose blister cards 12, 312 may include blisters 26, 326 arranged in concentric circles, or any other predetermined or random arrangement, for example.

Furthermore, while the above-described embodiments of the transfer fixtures 104, 404 include top plates 134, 434 and bottom plates 136, 436, alternative embodiments of transfer fixtures may include only top plates 134, 434 or only bottom plates 136, 436. So configured, the transfer fixtures 104, 404 may be carried within the respective machines 100, 400 by ledges or shelves carried by sidewalls (not shown) of the machines 100, 400, for example. Another alternative embodiment of the transfer fixtures 104, 404 may not include top plates 134, 434 and bottom plates 136, 436 at all, but rather, may include a center plate, for example, disposed between the inlets and outlets of the feed tubes 138, 438 and securing the feed tubes 138, 438 in the desired configuration. Such a center plate may be supported in the respective filling machine 100, 400 by a ledge or a shelf or some other means.

Further still, while the embodiment disclosed with reference to FIGS. 5 and 6*a* has been described as including a plurality of transfer fixtures 404, each transfer fixture 404 having feed tubes 438 configured for filling a prescription that begins on a particular day of the week, for example, an alternative embodiment may include a single transfer fixture 404 having adjustable feed tubes 438. So configured, the technician may manually manipulate the position of one or more of the feed tubes 438 to configure the transfer fixture 404 as required for filling prescription that begins on a particular day of the week. For example, with reference to the transfer fixture 404 depicted in FIG. 6*a*, the outlets 438*b* of the feed tubes 438 may be removably connected to the outlet apertures 442 in the bottom plate 436. Thus, prior to installing the transfer fixture 404 into the filling machine 400, each of the feed tubes 438 may, by default, be connected directly between corresponding inlets 440 and outlets 442 of the top and bottom plates 434, 436, similar to the feed tubes 138 depicted in FIGS. 2 and 3, for example. However, prior to installing the transfer fixture 404 into the filling machine 400, the technician may disconnect the outlets 438*b* of the feed tubes 438 from the first through fourth rows 449*a*-449*d* of outlet apertures 442 in the bottom plate 436 and shift them to the second through fifth rows 449*b*-449*e* of outlet apertures 442. Thus, it should be appreciated that in such an embodiment, the technician may be able to configure and reconfigure the feed tubes 438 according to any desired arrangement to meet the requirements of any particular prescription.

Further yet, while the embodiment of the filling machine 400 has thus far been described as including either a plurality of transfer fixtures 404 or a single reconfigurable transfer fixture 404 for adapting the filling machine 400 for filling prescriptions that begin on particular days of the week, a still further alternative embodiment may include a plurality of press plates 406 or an adjustable press plate 406, for providing this versatility. For example, the filling machine 400 may include a plurality of press plates 406 which are removably connected to the piston 414. Each press plate 406 may include a distinct arrangement of cleats 430 for filling prescriptions that begin on a particular day of the week. For example, a first press plate 406 may only include cleats 430 corresponding to the particular blisters 326 of the multi-dose blister card 312 which are to be filled.

While both embodiments of the machines 100, 400 described herein have included moveable press plates 106, 406, alternative embodiments may include moveable cleats 130, 430, for example. The movable cleats 130, 430 may be moveable between the top side 106*a*, 406*a* and the bottom side 106*b*, 406*b* of the press plate 106, 406. So configured, the technician may move only those cleats 130, 430 which are required to fill a particular prescription to the bottom side 106*b*, 406*b* of the press plate 106, 406. In some embodiments, the cleats 130, 430 may be retractable through the press plate 106, 406, where such retraction may be manual. In another embodiment, the cleats 130, 430 may be magnetically positioned on the top side 106*a*, 406*a* and/or the bottom side 106*b*, 406 of the press plate 106, 406. In still another embodiment, each of the moveable cleats 130, 430 may include individual actuators associated therewith such that the actuators may be electronically controlled to move the cleats 130, 430 to load the multi-dose blister cards 12, 312. So configured, the press plate 406 may be relatively stationary during loading of the multi-dose blister cards 12, 312, while the actuators move the cleats 130, 430 into and out of engagement with the blisters 126, 426 on the intermediate blister cards 118, 418.

Figure 6B:
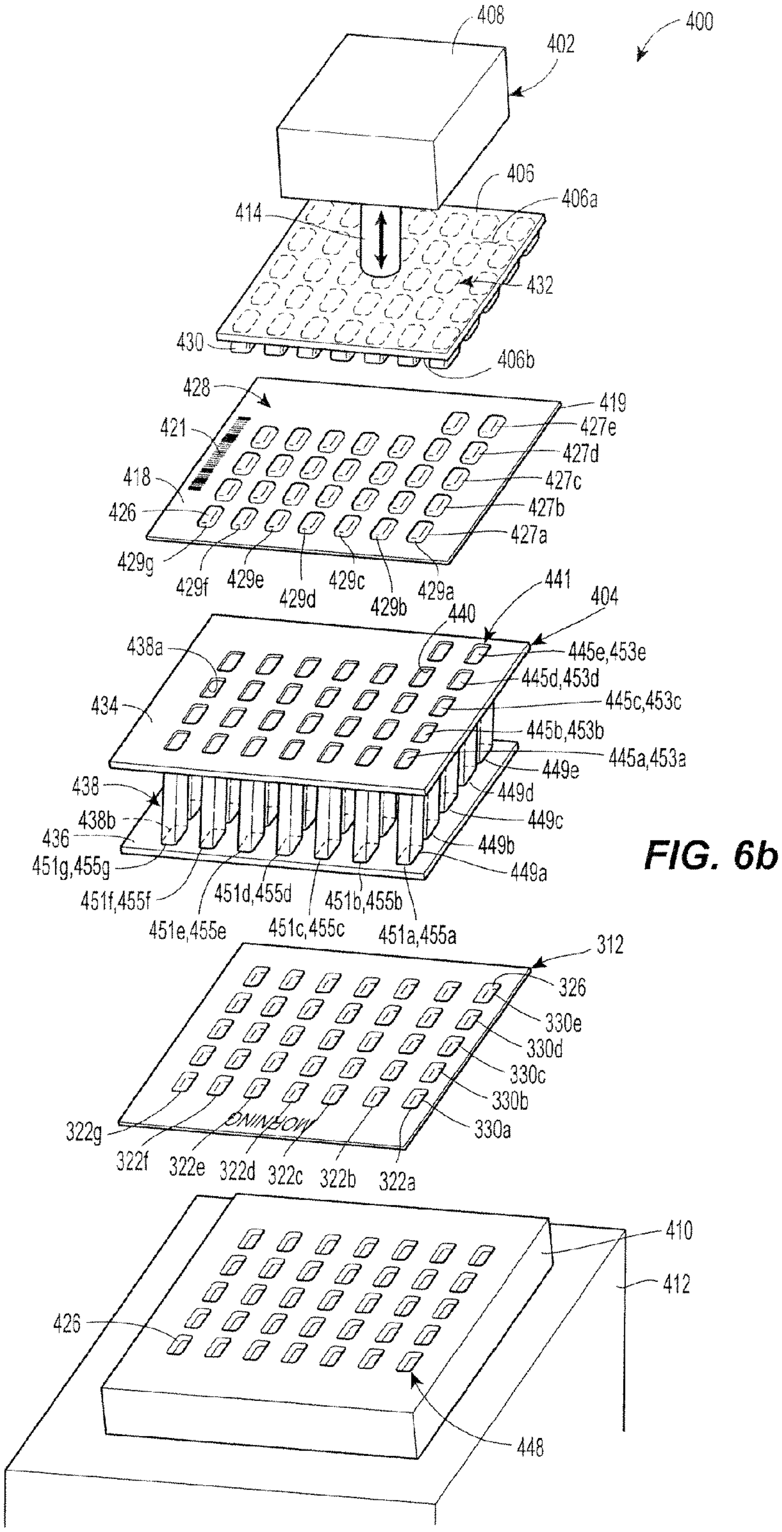
FIG. 6*b* is another perspective view of a system for filling multi-dose blister cards in accordance with an alternative embodiment of the present invention.

FIG. 6*b* illustrates an alternative configuration of the filling machine 400*b*. The filling machine 400*b* illustrated in FIG. 6*b* is similar to the filling machine 400 from FIG. 6*a*, except that the intermediate card 418*b* includes only 30 blisters 428 and the transfer fixture 404*b* includes only 30 inlet apertures 440, along with 30 corresponding feed tubes 438. Depending on the configuration of the feed tubes 438, the transfer fixture can facilitate the filling of multi-dose blister cards having 35 blisters with 30 pills, wherein the prescriptions begin on different days of the week.

While the transfer fixtures have been described herein as comprising top and bottom plates connected by a plurality of feed tubes defining passageways for carrying tablets between the intermediate cards and the multi-dose blister cards, one alternative embodiment of a transfer fixture can comprise a block of material defining a plurality of through-bores for carrying tablets. In another embodiment, the feed tubes need not be complete tubes at all, but rather, can include slides or channels, for example, having generally u-shaped cross-sections defining passageways for carrying the tablets. This configuration may be particularly effective in embodiments where the feed tubes are angled, as described with the preferred embodiments disclosed herein.

While quality of product is important in most businesses, quality of product is especially important in the pharmacy business where drug safety is critical. Because accuracy of prescription filling is critical in providing a safe product information processing requires monitoring of the blister card 12 filling process and verification and checking of the final content of the blister card 12.

Figure 7:
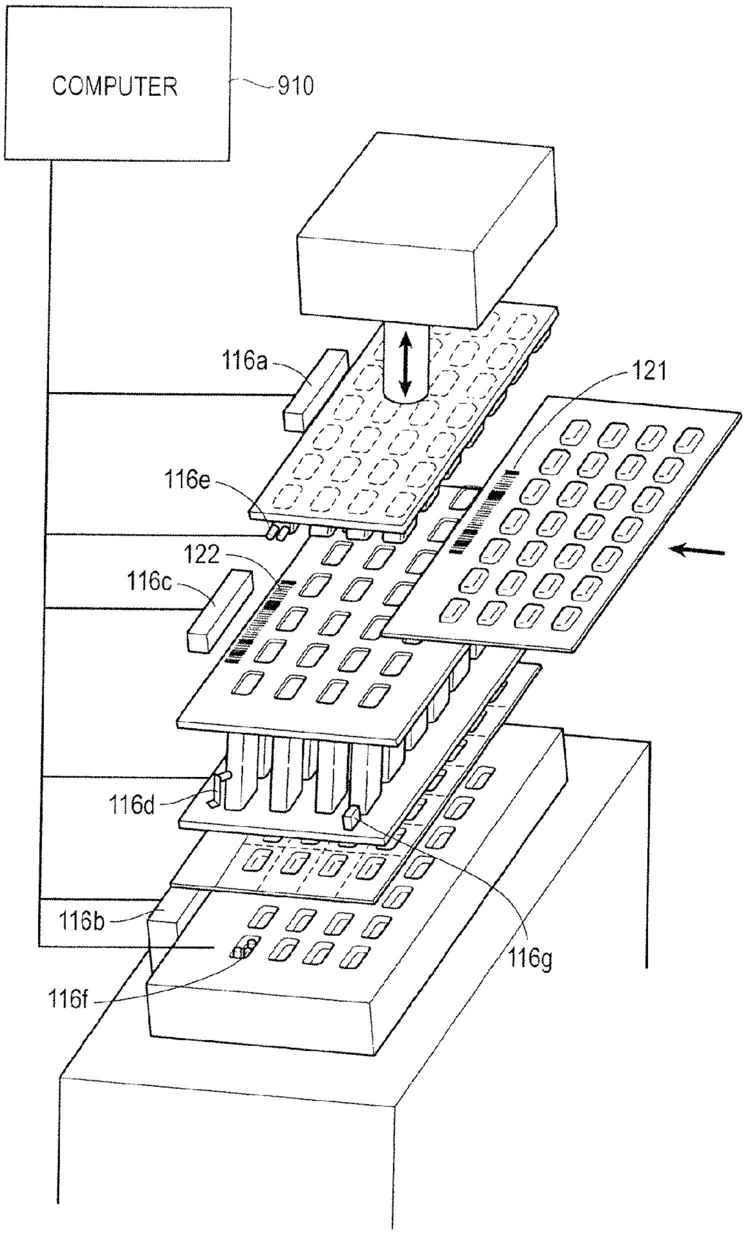
FIG. 7 illustrates an embodiment of a filling machine with various sensors for use in a product verification process.

FIG. 7 illustrates an embodiment of the filling machine 100 with various sensors for use in a product transfer and monitoring/verification process. Generally, the system illustrated in FIG. 7 may be used to monitor the selection and configuration of the filling machine 100, to monitor the transfer of product from an intermediate card 118 to a blister card 12, and the verify the contents of the blister card 12. An intermediate card verification scanner 116*a* may be used to confirm the identity of a specific intermediate card 118 before using the intermediate card 118 in the filling machine 100. In the embodiment of FIG. 7, the intermediate card 118 verification scanner 116*a* may be disposed near an insertion dock or surface for receiving the intermediate card 118 into the transfer fixture 104 so that the intermediate card 118 is automatically scanned. The intermediate card scanner 116*a* may also be disposed in a different area for verification of the identity of the intermediate card 118 before insertion of the card into the filling machine 100 or after selection the card for use in the filling machine 100. The intermediate card scanner 116*a* may also be configured to require interaction with the technician to scan the intermediate card 118.

A blister card scanner 116*b* may be used to confirm the identity of a particular blister card 12 before loading the blister card 12 into the transfer fixture 104 or after selection of the blister card 12 for use in the filling machine 100. This may be performed automatically when the blister card 12 is placed in the filling machine 100 or through manual interaction with a technician. In the embodiment shown in FIG. 7, the blister card verification scanner 116*b* may be disposed near the insertion dock for receiving the blister card 12 into the transfer fixture 104. While the scanner is shown disposed near the insertion dock, the scanner may also be disposed in another area for verification of the blister card 12 before insertion of the card or before use of the card in the fixture.

The intermediate card scanner 116*a* and blister card scanner 116*b* may be any suitable scanning device for sensing the identity of a card (e.g., 118 or 12). For example, the scanners 116*a* and 116*b* may be an infrared scanner (e.g., a bar code scanner), a radio frequency identifier (RFID) reader, an optical scanner, etc. The intermediate card scanner may be used to scan a tag 121 placed on the intermediate card 118. The tag 121 may represent a bar code (or other suitable readable visual mark) or may be an embedded communication transmitter or transponder, such as an RFID tag.

Similar to the intermediate card scanner 116*a*, the blister card scanner 116*b* may be any suitable scanning device for sensing the identity of the intermediate card 118, such as an infrared scanner (e.g., a bar code scanner), a radio frequency identifier (RFID) reader, an optical scanner, etc. In the embodiment illustrated in FIG. 7, the intermediate card scanner may be used to scan an identifier tag 121 that is disposed on the intermediate card 118. The tag 121 may represent a bar code, or any other suitable readable visual mark, or may be an embedded communication transmitter or transponder, such as an RFID tag.

FIG. 7 also illustrates a transfer fixture configuration scanner 116*c*. As described above, some embodiments of the blister filling machine 100 may involve using different premade transfer fixtures to facilitate the loading of the blister cards 12 with the content of the intermediate cards 118. The transfer fixture configuration scanner 116*c*, similar to the intermediate card scanner 116*a* and the blister card scanner 116*b*, may be used to verify or confirm the correct selection of a transfer fixture 104. The scanner 116*c* may scan an identifying component of the transfer fixture 122, e.g., a bar code or an RFID. Alternatively, the scanner 116*c* may scan the configuration of the feed tubes to confirm the correct transfer configuration (e.g., using an optical scanner or infrared scanner). The filling machine 100 could alternatively be configured to use pins or registers to verify that a correct transfer apparatus has been selected for use with a corresponding patient's prescription.

FIG. 7 further illustrates sensors 116*d* disposed on the feed tubes to detect the falling of the pills into the blister cards 12 and to further ensure that the pills do not stick to the tubes. These sensors 116*d* may be disposed on the sides of each tube (e.g., one or more for each tube). There may be separate sensors for the bottom and top of the tubes. Theses sensors may be, for example, optical or infrared sensors.

FIG. 7 illustrates sensors 116*e* associated with the intermediate card 118. Sensors 116*e* may include a set of sensors for each blister 26 of the intermediate card 118, and may be used to confirm the contents of the intermediate card 118. For example, a sensor of the set of sensors 116*e* may detect whether a blister 26 of the intermediate card 118 contains a pill (e.g., using an infrared sensor). Also, one of the sensors 116*e* may be used to detect what type of pill is contained in the intermediate card 118 (e.g., using a biomedical sensor). One of the sensors 116*e* may also be used to detect that the contents of a blister 26 have been dumped after the press and transfer process is completed. Sensors 116*e* may be disposed on the press 102 (e.g., on the press plate 106) or, alternatively, sensors 116*e* may be disposed on the transfer fixture 104 or an insertion dock coupled to the transfer fixture 104 (not shown).

FIG. 7 also illustrates a set of sensors 116*f* for each blister of the blister card 12. Generally, sensors 116*f* may be used to verify the contents of the blister card 12 during the fill operation or as a final blister quality check. One or more different sensors 116*f* may be used to provide confirmation of blister content.

One of the set of sensors 116*f* may be a weight sensor. For example, one or more weight sensors may be disposed about the blister card 12 (e.g., on the blister card tray 110 or on the transfer fixture 104) to determine whether the blister card 12, to a certain tolerance, has the requisite weight for the given drug mix. A weight reading may be taken to reveal a final weight of the blister card 12 after the fill process. One or more weight readings may also be taken during the fill process to check whether the changes in weight of the blister card 12 correspond to the expected pharmacy product weight being dropped into the blister card 12. Additionally, a weight sensor at multiple blister locations may be used to determined whether the pills are all consistent. For example, for a given intermediate card 118 dump if some sensor readings (e.g., on one area of the card) are reading a heavier weight than another for the same pill, then the contents of the intermediate card 118 may be defective.

One of the set of sensors 116*f* may be optical. In this embodiment, a visual picture of the contents of the blister may be taken. A separate picture for each blister may be taken for verification by a pharmacist. Because each blister may contain multiple pharmacy products, such as pills, the contents may be stacked on top of each other, thereby blocking a clear line of site to each product or pill contained in the blister. To reduce this problem, an interface for the blister card 12 with the filling machine 100 may comprise a dock or blister tray 110 that is adapted to vibrate (as discussed above). This vibration may be driven by a motor coupled to the dock or tray. As the tray 110 vibrates, the contents of the blister may be rearranged and multiple pictures may be taken of the blister contents during the vibration. The number of pictures, and the frequency and amplitude of vibration may be adjusted in order to provide a statistically relevant picture sample (e.g., a sample showing clear line of sight images of each the products). The number of pictures, frequency and amplitude of vibration may be adjusted according to a predetermined target number or type of pills being placed into the blisters 26. For example, where the number of pills is much greater than the square area of the bottom of the blister, there may be more frequent and vigorous vibration with a higher total number of pictures taken. In another example, the vibration and number of pictures taken may be adjusted to result in a high probability that the each pill in each blister 26 will be captured by at least one of the multiple pictures. It should be noted that while the vibrating process is described for used with a sensor that provides image data, the vibrating process may be helpful for any sensor that requires a line of sight to a target object.

One of the set of sensors **116*f* may be a mass spectroscopy sensor. In this case, one or more emitters may be positioned around each blister 26 to irradiate the blister contents from different angles. In FIG. 7, the emitters are shown disposed on the transfer fixture, however the emitters may be disposed on the blister tray or suspended near the blister card using a separate structure (not shown). A spectroscopy sensor may represent a set of sensors surrounding the blister to measure the light reflected or refracted by the contents of each blister 26**. In some embodiments, each blister may be irradiated until all content is verified to exist based on the monitored spectra. If the irradiation does not result in a confirmation of all desired blister content after a predetermined period of time, the blister may be defective, or flagged for review by a technician or pharmacist. The predetermined irradiation time may be calculated to produce a high probability that spectra for each pill in the blister is measured. The emitters may be, for example, UV light, visible spectrum light, infrared, etc. where the sensors used correspond to the spectrum of the emitters.

In an embodiment, a mechanical mechanism may be used to verify or detect the identity of the intermediate card 118 and/or blister card 12. In this embodiment, the intermediate card 118 or blister card 12 may be shaped in a specific way to correspond with a prescription product contained in the intermediate card 118. The shape of the insertion dock may be configurable to correspond to the shape of a desired intermediate card 118 or blister card 12. Alternatively, the shape of the transfer fixture interface that accepts the intermediate card 118 may be adapted to adjust to a particular shape to correspond with a corresponding intermediate card 118 or blister card 12 shape for confirming a pharmacy product. In this mechanical verification apparatus, a mismatch in the shape of the intermediate card 118 or blister card 12 may prevent the intermediate card 118 from interfacing with the transfer fixture, thereby preventing the press 102 from being operable.

In another embodiment, the size and/or shape of the blisters 26 of the intermediate card 118 or blister card 12 may be indicative of the identity of the prescription product contained in the blister. In this embodiment, the shape of the inlet and outlet apertures 140, 142 leading into and out of the feed tubes may be configurable to match a desired blister shape. In this mechanical verification apparatus, a mismatch in the shape/size of the blisters 26 of the intermediate card 118 or blister card 12 with the apertures 140 and 142 may prevent the intermediate card 118 or blister card 12 from linking with the transfer fixture, thereby preventing the press 102 from being operable.

Figure 8:
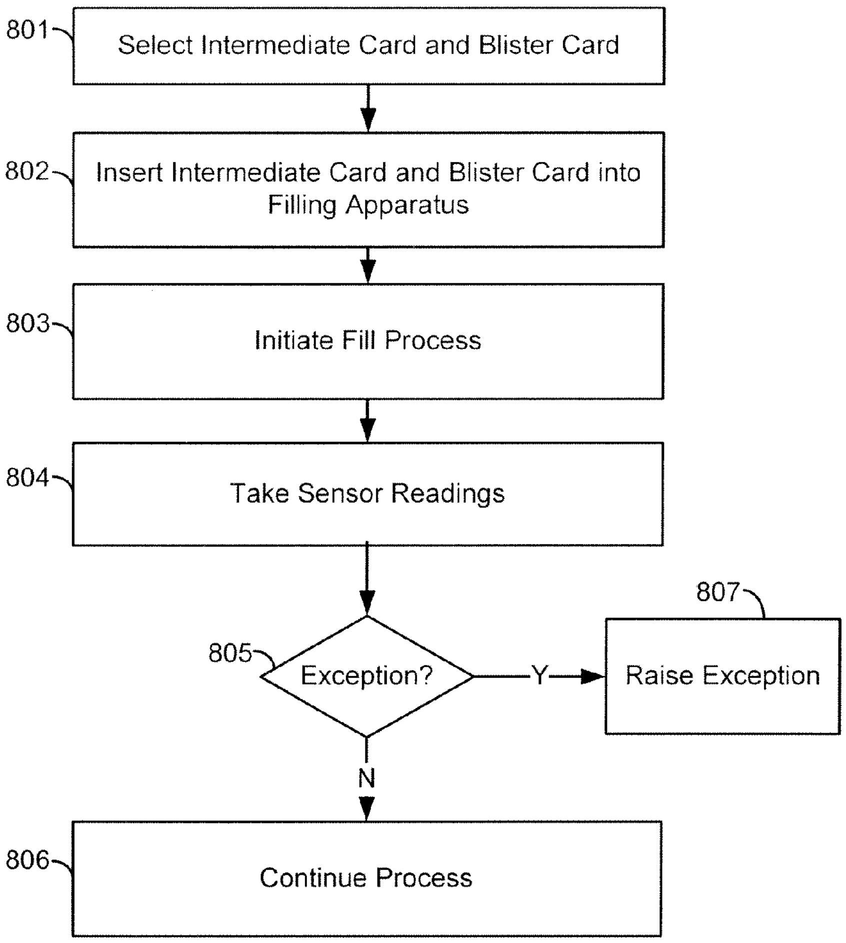
FIG. 8 illustrates an embodiment of a monitoring process for a filling machine.

FIG. 8 illustrates an embodiment of a monitoring process for the multi-dose blister filling machine 100 of FIG. 7. An intermediate card 118 and a blister card 12 may be selected manually by a user or automatically by a machine (block 801) and inserted into the filling machine 100 in the corresponding docks (block 802). For example, the intermediate card 118 for a fill process may be inserted or placed on a loading platform (such as top plate 134) and the blister card 12 may be inserted or placed in a blister tray 110. In an automatic selection embodiment, the computing device may receive an order (e.g., a prescription) for a particular product (e.g., a pharmacy product), and may identify a product of one of the intermediate cards (e.g., by identifier) as an ingredient of the blister card. The computing device may then be programmed to indicate a selection of an intermediate card based on the product order. In some embodiments, a desired transfer fixture may also be loaded or inserted into the filling machine 100. Before or during initiation of the press 102 (block 803), sensors **116*a-c* may be used to detect and confirm the identity of the blister card 12, the intermediate card 118, and the transfer fixture 104** for the current fill operation. In some embodiments, each of a plurality of intermediate cards, transfer fixtures, and blister cards may be indexed by an identifier (e.g., of the computer) uniquely identifying the particular index card. In some embodiments the intermediate card identifier may indicate a product type contained by the intermediate card. As discussed above, the intermediate card may be physically labeled with its identifier(s). The computing device may store a record of the available intermediate cards by intermediate card identifiers. As discussed, the identifiers may indicate the identity of a card and/or a product of the card. The record may be stored in any general manner as known by those skilled in the art (e.g., by a listing, table, registry, etc.) In some embodiments, the computing device may record a map of empty or filled cells of the intermediate card. This may be useful when the intermediate card may only be partially used (e.g., due to a partial release of content). In this case, the card may be reused in a later filling process based on the map.

In some embodiments, an identifier of the transfer fixture may contain configuration information indicating output cell positions that correspond to input cell positions showing where the content of an intermediate card cell position will be deposited on a blister card. Based on the electronic product order, the computing device may be programmed to determine or select the appropriate transfer fixture for inserting into the filling machine. For example, in some embodiments, the transfer fixture may be selected based on the blister configuration for a product drop (e.g., which blister card cells are to have a product deposited). In some embodiments, the product order may contain mapping information regarding product cell locations. In some embodiments in which the transfer fixture passageways (i.e., the connection between inlet and outlet port) changes, the computing device may update the configuration information associated with the transfer fixture via a change in data associated with the transfer fixture identifiers. This may be done automatically by the computing device by detecting the passageway change (using the sensors described above).

In some embodiments, the press plates may also be indexed by identifiers, where the press plates may be labeled by the identifiers and selected based on the identifiers. An identifier may uniquely identity a particular press plate. In some embodiments in which the press plates 106 are removable or configurable, an identifier may be used that indicates configuration information of the press plate. For example, the configuration information may indicate a mask arrangement for the press plate (e.g., showing which cell positions of the intermediate card will be affected by the press plate). The press plate may be selected based on a product place configuration determined from an electronic product order and on a combination of other components (e.g., intermediate card selection, transfer fixture selection, blister card selection, etc.).

In some embodiments, the blister cards may be indexed by unique identifiers. This may be helpful in using the computer to track the progress of a blister card fill process. This may be important in situations in which a particular blister card may not be filled completely in one operating sequence. For example, a first blister card may be filled with a first product and removed from the filling machine. Then, a second blister card may be insert and filled with the first product, before the first blister card is reinserted for a second fill. The unique identifier may be necessary to determine the progress or fill sequence of a blister card. The blister card may be further associated with information regarding product maps using the identifier. For example, a map may be stored (e.g., associated with the unique identifier) to indicate the cell locations of product already deposited (e.g., a deposit state) into a blister card. This map information may be further checked by the computing device along with information on a loaded intermediate card, transfer fixture, or press plate, to determine if the combination (e.g., of blister card, transfer fixture, or press plate) corresponds with a current fill sequence.

In some embodiments, sensors 116*e* may be used to verify the contents of the intermediate card (block 804). If there is any inconsistency or error (block 805), an exception may be thrown (block 807) and the press 102 may be prevented from initiating or operating further. If there is no inconsistency or error, then the press 102 may begin the process of dumping the pharmacy product from the intermediate card 118 into the feed tubes for transport to the correct blisters 26 of the blister card 12 (block 806). During the filling process, sensors 116*d* may be used to detect whether the pharmacy products have passed through the tubes and entered the blisters 26 (e.g., during block 804). The sensors may also determine take readings identifying the product during travel or deposit. Again, if there is any error (block 805), an exception may be thrown (block 807) and operation halted, otherwise the fill operation is allowed to continue (block 806). For example, the computer may provide or generate an indication that the process may continue (e.g., to operate the filling machine to release product to the blister cards). As the pills are collected or after the pills are collected in the appropriate blisters 26 of the blister card 12, sensors 116*f* may be used to, for example, take images of the pills, take mass spectroscopy readings of the pills, take olfactory readings of the pills, or measure a weight of the blister card 12 (e.g., during block 804). Any of the above described sensors may provide sensor data such as weight data, spectrographic data, olfaction data, pH data, toughness data, tensile strength data, composition data, temperature data, humidity data, or image data.

It should be noted that while the monitoring process was described in a sequential manner, the different sensor measurements may be taken in any order and at any convenient time depending on the configuration of the filling machine 100. Additionally, while some of the checks and monitoring may be performed during the filling process (such as the detection of incorrect intermediate cards 118 or blister cards 12), some of the measurements may be checked after the filling process. For example, the sensor readings related to the final blister card content (e.g., images, weights, mass spectroscopy readings, etc.) may be stored in a computer 910 until a pharmacist is ready to review them. These checks may be done either locally by a pharmacist situated near the filling machine 100 or remotely by a pharmacist at another pharmacy resource location.

In some embodiments, the filling machine may operate a plurality of times using a plurality of intermediate cards to produce a multi-product blister card (e.g., having multiple different products per blister card cell or multiple different products in different cells, as discussed above). In these embodiments, the computing device may be programmed to record a sequence of product releases or intermediate card usages (e.g., by intermediate card identifiers). This may enable the computing device to determine whether a currently loaded intermediate card has been previously used to fill a particular blister card. An error may be generated if a previously used intermediate card has been applied to a currently loaded blister card. In some embodiments, the electronic product order may provide a sequence in which the products are to be deposited to the blister card. The computing device may be programmed to retrieve this sequence from the electronic product order. In some embodiments, the computing device may be programmed to determine the sequence of deposit based on the characteristics of the ingredient products for the blister card designated by the product order (e.g., in situations in which product mixing is required in the blister card cells in a particular sequence based on characteristics of the ingredient products). The computing device may be programmed to indicate whether a loaded intermediate card is appropriate for a particular blister card (e.g., a blister card currently loaded) based on the sequence.

Figure 9:
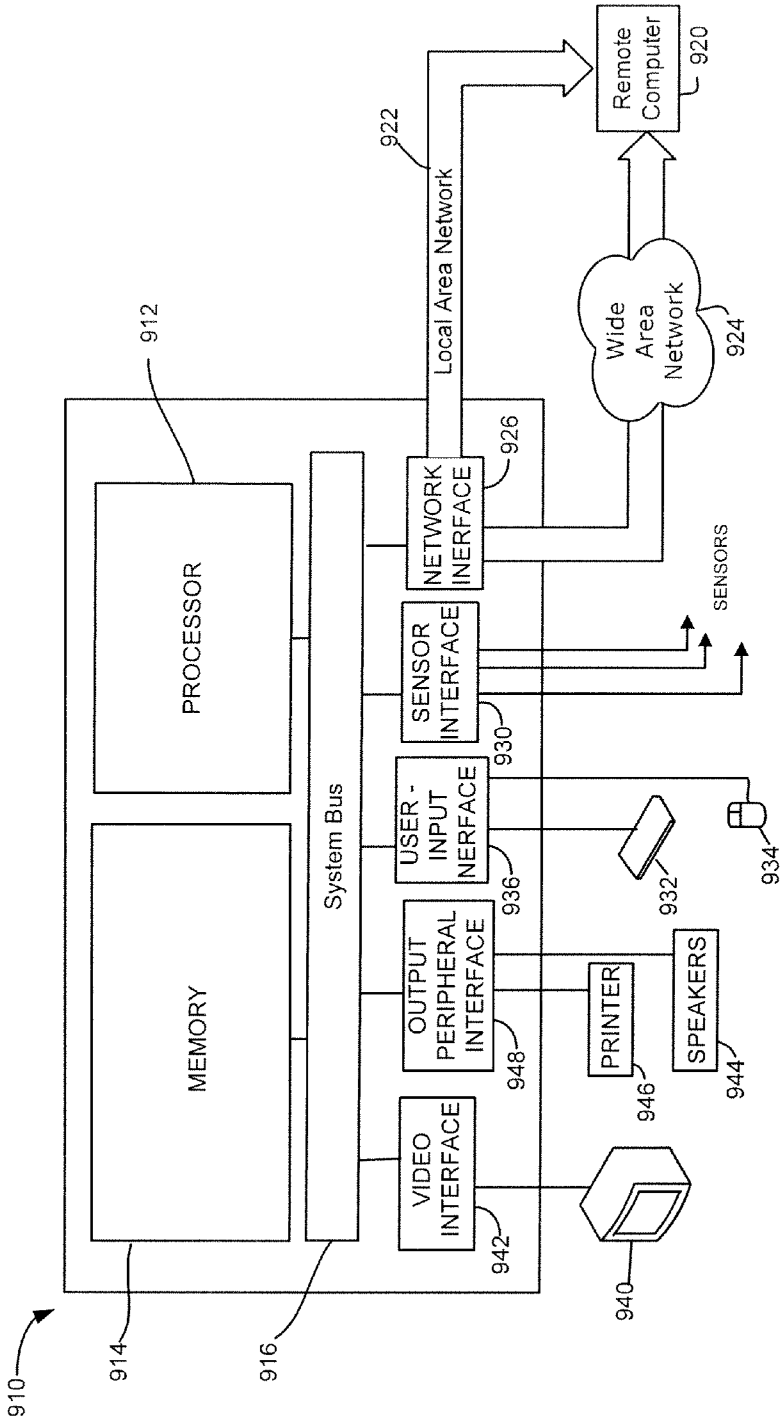
FIG. 9 illustrates an exemplary computing system which may be used to monitor and analyze sensor readings from a filling machine.

FIG. 9 illustrates an exemplary computing system 900 which may be used to monitor and analyze sensor readings from the filling machine 100 of FIG. 7. The computing system 900 includes a computer 910 that may be used to implement any blocks of the claimed method and apparatus. Components of computer 910 may include, but are not limited to, a processing unit 912, a system memory 914, and a system bus 916 that couples various system components, including the system memory 914 to the processing unit 912. Computer 910 typically includes a variety of computer readable media that may be any available media that may be accessed by computer 910 and includes both volatile and nonvolatile media, removable and non-removable media. For example, the system memory 914 may include computer storage media in the form of volatile and/or nonvolatile memory such as read only memory (ROM) and random access memory (RAM). The computer 910 may also include other removable/non-removable, volatile/nonvolatile computer storage media (not shown) such as a hard disk drive, a magnetic disk drive that reads from or writes to a magnetic disk, and an optical disk drive that reads from or writes to an optical disk. The computer 910 may operate in a networked environment using logical connections to one or more remote computers, such as a remote computer 920, via a local area network (LAN) 922 and/or a wide area network (WAN) 924 a network interface 926. Those of ordinary skill in the art will appreciate that the computer 910 could be replaced with or used in conjunction with one or more Programmable Logic Controllers (PLCs).

The sensors of the filling machine 100 may be connected through a sensor input/output interface 930 that is coupled to the system bus 916, or may be connected by other interface and bus structures, such as a parallel port, game port or a universal serial bus (USB). These devices could alternatively be entirely external devices. A user may enter commands and information into the computer 910 through input devices such as a keyboard 932 and pointing device 934, commonly referred to as a mouse, trackball or touch pad. Other input devices (not illustrated) may include a microphone, joystick, game pad, satellite dish, scanner, or the like. These and other input devices are often connected to the processing unit 912 through a user input interface 936 that is coupled to the system bus 916, but may, similar to the sensor devices, be connected by other interface and bus structures, such as a parallel port, game port or a universal serial bus (USB). A monitor 940 or other type of display device may also be connected to the system bus 916 via an interface, such as a video interface 942. In addition to the monitor, computers may also include other peripheral output devices such as speakers 944 and printer 946, which may be connected through an output peripheral interface 948.

Figure 10:
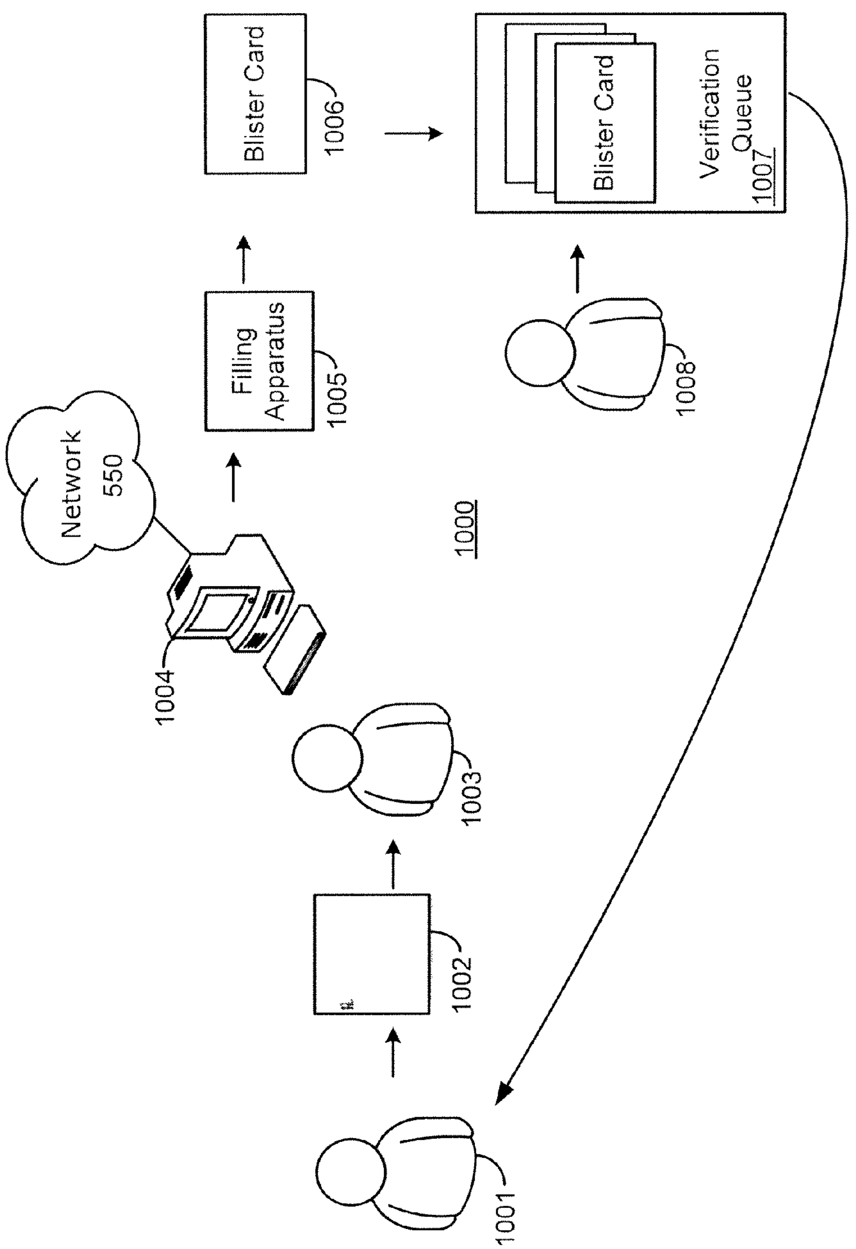
FIG. 10 illustrates a general multi-dose blister filling process using the filling machine and verification system of FIG. 7.

FIG. 10 illustrates a general multi-dose blister filling process using the filling machine and verification system of FIG. 7. A first pharmacy resource 1000 may include, for example, a pharmacist, a technician or non-pharmacist assistant 1003 that receives a physical prescription 1002 from a customer 1001 and inputs the prescription order 1002 into a networked computer 1004. If the prescription order calls for a blister card 12, then the pharmacist 1003 may contemporaneously begin filling blister cards 12 for the prescription order 1005 using a filling machine as described above. After the blister card 12 is prepared 1006, but before the blister card 12 is delivered to a customer 1001, the pharmacy product 1006 may be placed in a physical verification queue 1007 or storage container. The pre-verification blister cards in the verification queue 1007 may await a registered pharmacist 1008 to perform verification. After a verification process by a registered pharmacist 1008, the blister card may be approved for delivery to the customer 1001 that placed the order. If the blister card is discovered to be deficient, defective, or incorrect in any way during the verification process, then the blister card may be discarded and a new blister card may be processed. If the deficiency can be easily remedied, for example, when a few blisters 26 have incorrect content, then those blisters 26 may be individually filled as needed. If the deficiency can be easily remedied, the pharmacy product may be held at the verification queue 1007 until the deficiency is remedied and a second verification process approves the product.

Product verification may involve determining whether the actual blister pack contents corresponds to the pharmacy product ordered in a prescription order. This may involve determining the contents of each blister 26 in a blister pack stored in the pre-verification queue and comparing the pre-verification blister pack to reference information of the blister pack on the prescription order. For example, the prescription order may contain drug identifying information such as a drug name, a drug type, and/or other drug characteristics. The drug identifying information may include a drug identifier such as a drug code that may identify the drug in a reference source (e.g., a physical index or database). The drug identifying information may be used to retrieve reference information on the pharmacy product for comparison against the prepared product. Product verification may also be based on a pharmacist's own knowledge of drug information. For example, the pharmacist may recognize the drug identifier or other drug identifying information and based on the pharmacist's knowledge of a characteristic of the prescription order product, examine the prepared product to determine if it corresponds to the product identified in the prescription order.

Figure 11:
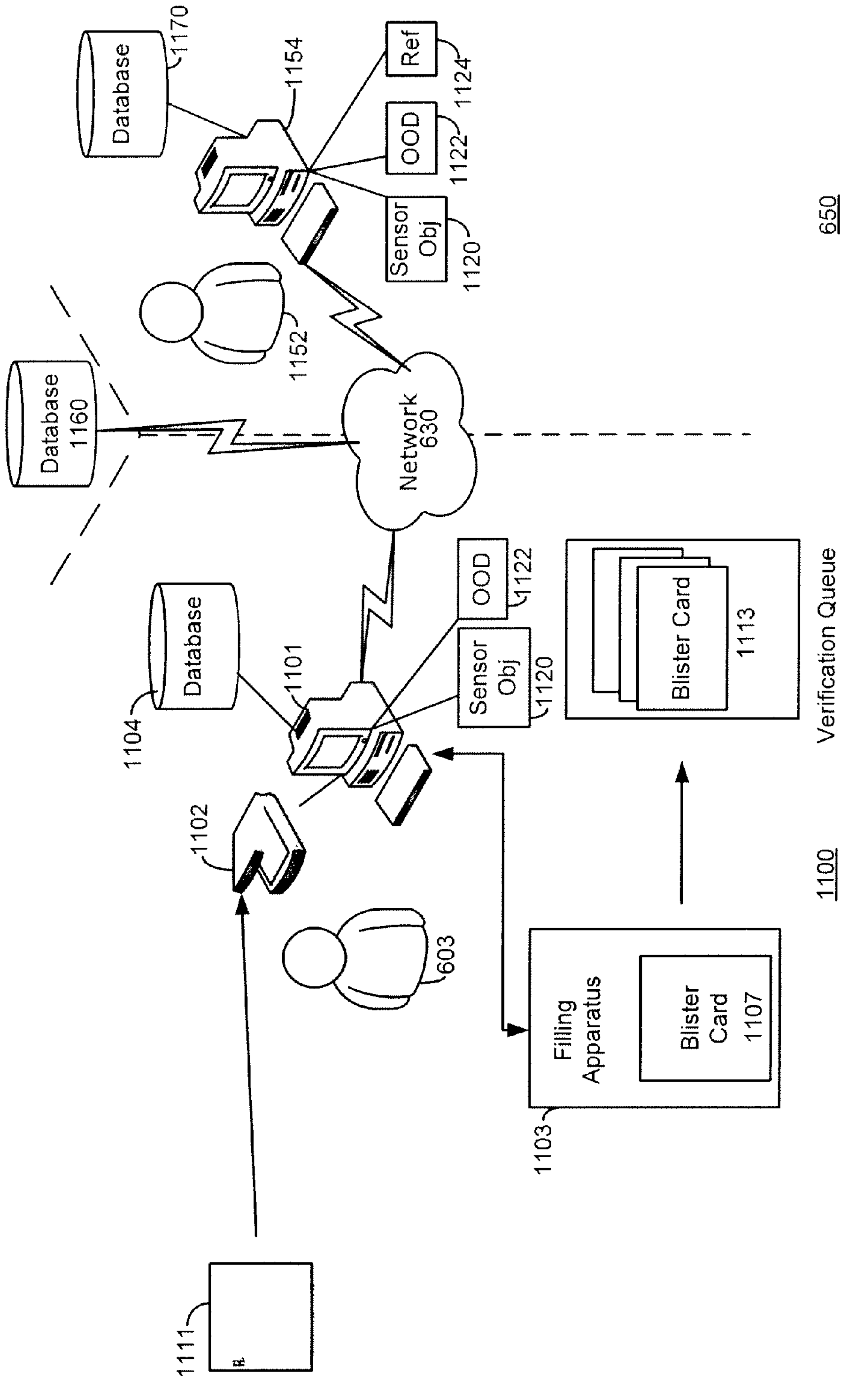
FIG. 11 illustrates an embodiment of a system for transmission of sensor readings from the filling apparatus to a remote computer for analysis.

FIG. 11 illustrates a system for enabling transmission of sensor readings from the filling machine 1103 to a second computer from a first computer. FIG. 11 illustrates an embodiment in which a first pharmacy resource 1100 at a first location may include a first computer 1101 that is connected to a pharmacy computer network 1130. Alternatively, the second computer may be located at a first pharmacy resource or remotely at a second pharmacy resource. The computer 1101 may be connected to a filling machine 1103, adapted with biomedical sensors (as illustrated in FIG. 7), and a document scanner 1102. The document scanner 1102 may be used to scan customer specific data such as insurance information, payment information, etc. The document scanner 1102 may also capture original order data, such as an image of a physical prescription 1111, and create an original order data object 1122.

As discussed above, the sensors of the filling machine 1103, which may be various types of biomedical sensors of the filling machine and may take one or more readings associated with the contents of a blister pack 1107 associated with a prescription order 1111. This sensor data may be contained in a sensor data object 1120. The sensor data object 1120 may then be stored on a local database 1104 or a central database 1160. The sensor data object 1120 may then be associated with an electronic prescription order on the pharmacy network 1130. This electronic prescription order may include all the information from the physical prescription information. An original order data object 1122 formed from scanning the physical prescription into the network system may be associated with the electronic prescription order.

A remote pharmacist 1152 located at a second pharmacy resource 1150 having a second computer 1154 may then perform verification of the pharmacy product for the prescription order. The remote pharmacist 1152 may use the second computer 1154 to retrieve the sensor data object 1120 and display a sensor reading (e.g., an image or spectroscopy reading) of the blister card 1107. The remote pharmacist 1152 may then reference information in the electronic prescription order to determine the identity of a customer requested product. Once the remote pharmacist inspects the sensor data and determines that the sensor data corresponds, within a threshold level, to a characteristic(s) of the product associated with the prescription order information, the remote pharmacist may provide an indication that the product is ready for release to a customer. If the product is deficient or defective, then the remote pharmacist 1152 may raise an exception to the prescription order and provide an indication of the exception.

Figure 12:
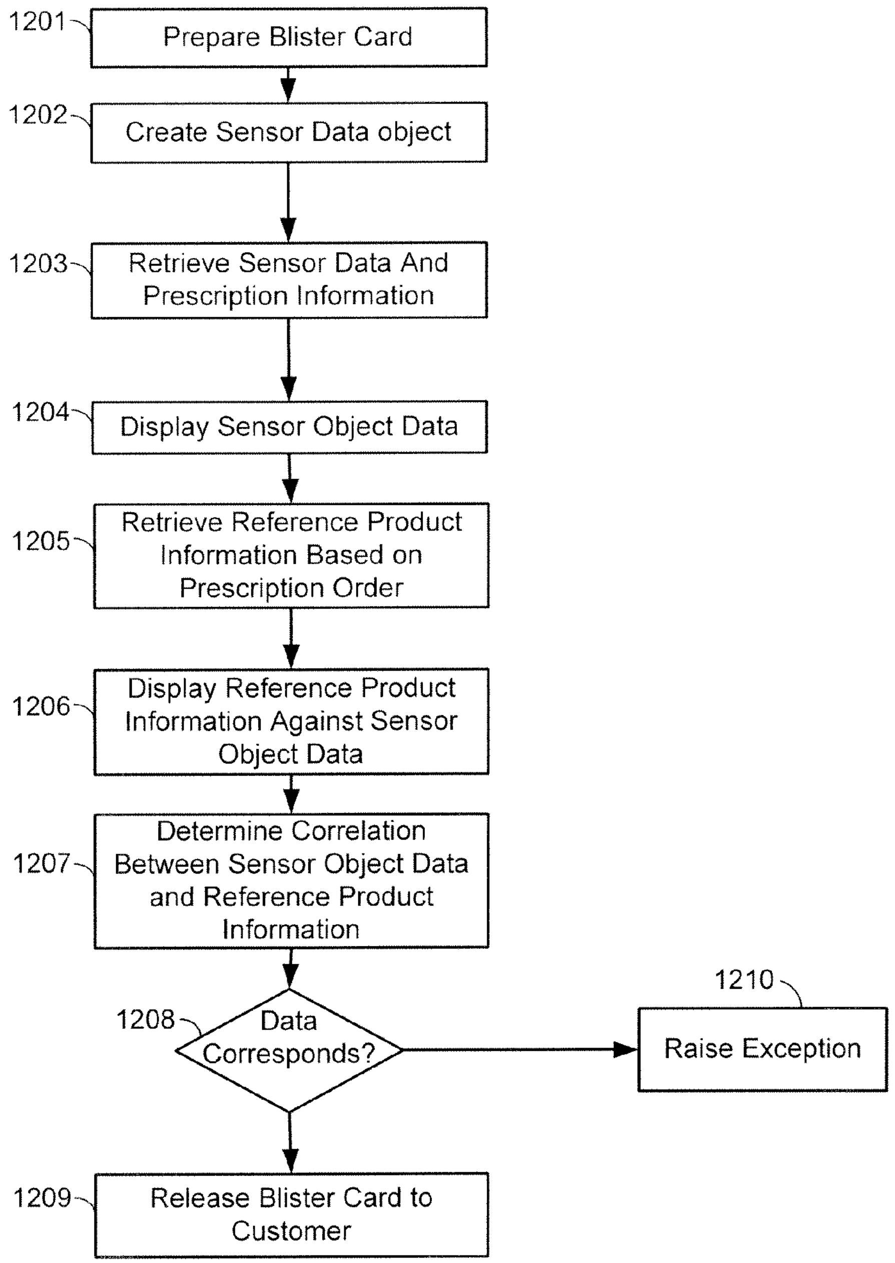
FIG. 12 illustrates a verification process using the system of FIG. 11.

FIG. 12 illustrates a process for verifying the contents of the blister card using the system of FIG. 11. The system of FIG. 11 may take readings of the blister pack before or after the blister pack is prepared 1201. In particular, readings may be taken using an appropriate sensor(s) (e.g., sensor 116*f* of FIG. 7), thereby creating a sensor data object 1202. A pharmacist may then retrieve the sensor data along with prescription order information 1203 and reference information based on the prescription order information. This may be done remotely from where the sensor readings are taken or locally.

In accordance with one embodiment, a pharmacist at a remote location may retrieve the sensor data object and display the sensor data on a remote computer screen 1204. The pharmacist may then reference a database (e.g., 1104, 1160, or 1170) to retrieve drug and/or pharmacy product characteristic information 1205. The reference information, which may be in the form of a reference object, may provide descriptions of images of the physical appearance or chemical characteristics of a drug or pharmacy product which the physician may then use to determine the identity of the product or the quality of the product contained in the blister pack. The reference data may contain image objects or reference sensor readings of drug and other pharmacy products that may be used in the analysis of the sensor data for the pre-verification product. The reference data may include any physical characteristic data on the product being deposited into a blister pack. For example, the reference data may include color, shape, size, quantity, density, etc. of the product. Corresponding sensor data for the reference data may be generated for comparison. In some embodiments, the reference objects may be indexed by a drug identifier. When a pharmacist at the second computer 1154 initiates a verification process for a blister 1107, the pharmacist may use the second computer 654 to retrieve a reference data object 1124 based on a drug identifier on the electronic prescription order.

Figure 13:
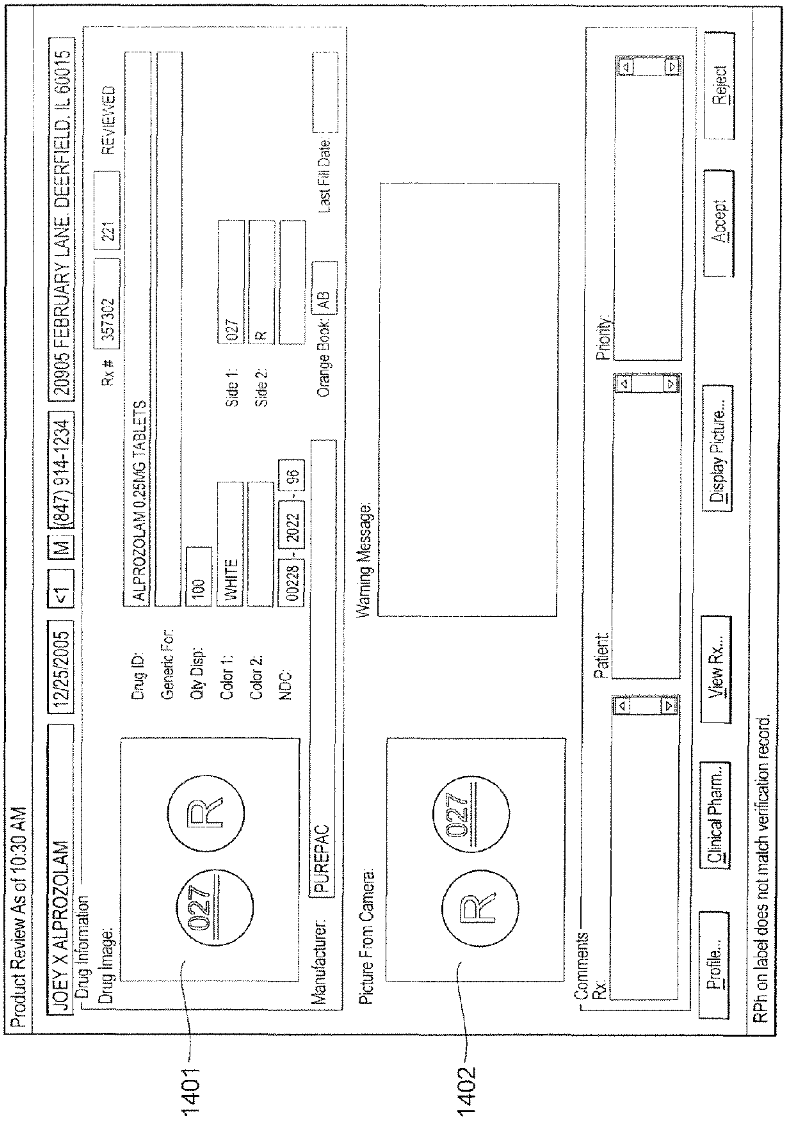
FIG. 13 illustrates a display interface for comparing pharmacy product characteristics.

When a sensor reading involves a visual image of the vibrated blister card, the filling machine 100 may send multiple images of each blister 26 to the remote computer 1154 for review by a pharmacist. The remote computer 1154 used by the remote pharmacist 1152 for verification may be adapted to display the multiple images of each blister 26 and a reference image of each pharmacy product intended to be contained in each blister 26, according to information from the electronic prescription. As illustrated in FIG. 13, an image of the prepared drug 1401 and reference drug 1402 may be displayed adjacent one another to facilitate easier comparison of image characteristics by the remote pharmacist. The remote computer 1154 may be adapted to position the sample product image to correspond with an alignment of the reference image, or vice versa. For example, in a case in which the pharmacy product is a drug in pill form, the remote computer may crop the pills and align them on that their markings coincide with the angle of the pills shown on the reference image. This positioning may be automatic or may simply be provided as an option to the user of the second computer.

The remote computer 1154 used by the remote pharmacist 1152 for verification may be adapted to display other sensor readings from the filling machine and with corresponding reference data of a pharmacy product. Similar to image sensor readings, sensor readings such as mass spectroscopy readings may be displayed adjacent one another to facilitate easier comparison of product characteristics by the remote pharmacist.

As illustrated in FIG. 12, the remote pharmacist 1152 may determine the correlation between the data of the prepared blister card awaiting approval and reference product data 1207. As a note, analyzing sensor data may involve an experienced pharmacist simply referencing personal knowledge about a pharmacy product based on the prescription information and analyzing the weight data based on personal knowledge. The remote computer may also run a comparison program (e.g., optical recognition software) that provides an analysis of the sensor readings against expected readings for the sample. The sensor data comparison program may match sensor readings such as image, weight, density, composition, consistency, odor, viscosity, or any other number of physical or chemical characteristics of a pharmacy product to determine a correlation. In some embodiments, the sensor data comparison program may provide a first estimate of the likelihood that the sensed/measured pharmacy product (or sample of the pharmacy product) matches with reference information on the requested prescription product and await input from the remote pharmacist before indicating approval of the blister pack for delivery to a customer. If the data corresponds within a certain degree or tolerance (or threshold) 1208, then the blister card may be approved for release and delivery to a customer 1209. Otherwise, an exception may be raised 1210. This may result in the prescription not being filled or in an additional in-person review and verification by a registered pharmacist.

Because the filling machine may provide a plurality of sensors and consequently a plurality of sensor readings, the remote computer 1154 may be adapted to allow a user to display multiple sensor readings (for the different measured characteristics) against multiple reference data corresponding to the sensor readings. For example, in one pharmacy embodiment, an image of the pharmacy product may be captured as well as a weight reading. These two readings, along with corresponding reference data, may be displayed at the second computer for analysis.

The remote computer 1154 may be adapted to allow a user 1152 to prioritize the display of characteristics at the remote computer 1154 according to the user's preference. Alternatively, the remote computer may be adapted to display multiple sensor readings in a predetermined or default order for presentation. This predetermined order may be based on a priority of the characteristic data of the sensor readings. For example, for certain drug compounds, some characteristics may be more revealing of the identity or quality of the product, such as odor. Thus, where a sensor reading may include an olfaction reading, a weight reading, and an image reading, the olfaction reading may be listed first.

In another embodiment, multiple sensors of the same type (e.g., measuring the same characteristic) may be implemented to provide redundancy in case of sensor failure. Moreover, the system may take readings from the multiple sensors and compare these readings to ensure that they are consistent and to reduce the possibility of bad sensor readings from an individual sensor. In this case, an exception may be raised when readings from two similar sensors are different. Alternatively, the readings from two sensors measuring different physical characteristics of the pharmacy product may be analyzed to determine consistency. This may be the case where there is a recognized relation between the two physical characteristics. For example, where the toughness of the pharmacy product may be related to pH of the product, readings from a sensor measuring toughness and a sensor measuring pH may be displayed together for comparison. Alternatively, one of the computers 1101 or 1154 may calculate the expected relation(s) between the two readings or physical characteristics and display the different between the expected relation(s) at the second computer 1154.

The indication of the result of the verification process (whether an approval or an error/exception) may be made by modifying an attribute on the electronic prescription order. In this case, when a user at the first pharmacy resource retrieves or looks up the status of the electronic prescription order, an indication of the exception may be displayed. Alternatively, the indication may be made by sending a message via a messaging system such as instant messaging, email, fax, etc. An exception may be raised if the sensor data is deficient. For example, the sensor data may be based on a bad reading, e.g., it may be unreadable or otherwise inadequate. This type of exception may prompt a worker at the first pharmacy resource to re-measure the sample using a sensor. The exception may also be raised if the product is on its face, not ready for inspection.

What is claimed is:

1. A method of monitoring and verifying contents of a multi-cell blister pack comprising:

receiving an electronic product order for a blister pack at a first computing device, wherein the electronic product order requires multiple different products in the blister pack;

determining from the electronic product order a set of ingredient products of the blister pack;

retrieving stored physical characteristic data of multiple ingredient products for the blister pack;

scanning at least one cell of the blister pack to provide a computing device with data indicative of a physical characteristic of product content in the blister pack cell;

determining whether the retrieved product characteristic data corresponds with the scanned product content data of the blister pack cell; and generating an indication of whether the retrieved product characteristic data corresponds with the scanned product content data of the blister pack cell.

2. The method of claim 1, wherein the electronic prescription order requires multiple different products in at least one cell of the blister pack.

3. The method of claim 1, further comprising scanning each cell of the blister pack to provide the computing device an indication of whether a deposit is made to each cell and recording a mapping of cell position and deposit state for the cell position.

4. The method of claim 1, wherein the retrieved physical characteristic data includes a density of the ingredient product and a size of the ingredient product, and wherein scanning comprises measuring a change in weight of the blister pack as product is deposited into the blister pack.

5. The method of claim 1, wherein the scanned product characteristic data comprises measuring a color of a product in the blister cell, a shape of a product in the blister cell, and a size of the product in the blister cell.

6. The method of claim 1, wherein determining whether the retrieved product characteristic data corresponds with the scanned product content data comprises performing a scan of an identifier printed on an ingredient product contained in the blister cell.

7. The method of claim 1, wherein the physical characteristic data is an image of the product, and wherein scanning comprises capturing an image of a product contained in the scanned blister pack cell.

8. The method of claim 7, further comprising using image recognition software to automatically determine the identity of a product in the cell.

9. The method of claim 7, further comprising vibrating the blister pack to shuffle content of the blister cell and capturing a plurality images of content of the at least one cell over time.

10. The method of claim 9, further comprising vibrating the blister pack for a predetermined period of time based on the quantity of the set of ingredients of the electronic product order.

* * * * *